(12) United States Patent
Howard

(10) Patent No.: US 9,112,764 B2
(45) Date of Patent: Aug. 18, 2015

(54) TECHNIQUES FOR ASSIGNING INTERNET PROTOCOL VERSION SIX NETWORK BLOCKS IN UNKNOWN NETWORKS

(75) Inventor: Lee Howard, Fairfax, VA (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 154 days.

(21) Appl. No.: 13/237,901

(22) Filed: Sep. 20, 2011

(65) Prior Publication Data

US 2012/0314705 A1 Dec. 13, 2012

Related U.S. Application Data

(60) Provisional application No. 61/495,357, filed on Jun. 9, 2011.

(51) Int. Cl.
*H04L 12/56* (2006.01)
*H04L 12/701* (2013.01)

(52) U.S. Cl.
CPC ........................... *H04L 45/00* (2013.01)

(58) Field of Classification Search
USPC ......... 370/254, 255, 351, 389, 392, 401, 428; 709/220, 221, 222, 238, 239, 242, 245
See application file for complete search history.

(56) References Cited

U.S. PATENT DOCUMENTS

| | | |
|---|---|---|
| 2003/0056217 A1 | 3/2003 | Brooks |
| 2005/0099971 A1* | 5/2005 | Droms et al. ................. 370/328 |
| 2007/0217436 A1 | 9/2007 | Markley et al. |
| 2007/0268919 A1* | 11/2007 | Sarikaya et al. ............... 370/401 |
| 2008/0259925 A1* | 10/2008 | Droms et al. ................. 370/392 |
| 2009/0248794 A1 | 10/2009 | Helms et al. |
| 2010/0313236 A1 | 12/2010 | Straub |
| 2011/0047256 A1* | 2/2011 | Babu et al. ..................... 709/223 |
| 2011/0182295 A1* | 7/2011 | Singh et al. ................... 370/401 |
| 2012/0314617 A1 | 12/2012 | Erichsen et al. |

OTHER PUBLICATIONS

Troan et al., RFC 3633, IPv6 Prefix Options for Dynamic Host Configuration Protocol (DHCP) version 6, Dec. 2003, whole document.*

(Continued)

*Primary Examiner* — Andrew Chriss
*Assistant Examiner* — Jose Perez
(74) *Attorney, Agent, or Firm* — Otterstedt, Ellenbogen & Kammer, LLP

(57) ABSTRACT

A gateway router apparatus sends a first multicast SOLICIT message with a prefix length hint based on a number of network segments associated with the apparatus. The apparatus receives a second multicast SOLICIT message with a prefix length hint, from a downstream router in a premises network. At the apparatus, the following are recorded: (i) an estimated prefix length associated with the second multicast SOLICIT message; and (ii) an interface associated with the second multicast SOLICIT message. At the apparatus, a first ADVERTISE message is received, and a REQUEST message is sent, both over the internet. The REQUEST message specifies a prefix length based on the number of network segments associated with the apparatus and the recorded estimated prefix length associated with the second multicast SOLICIT message. The apparatus sends a second ADVERTISE message advertising ability of the apparatus to delegate prefixes in accordance with the REQUEST message.

22 Claims, 11 Drawing Sheets

(56) References Cited

OTHER PUBLICATIONS

Droms et al., RFC 3315, Dynamic Host Configuration Protocol for IPv6, (DHCPv6), Jul. 2003, whole document.*
Lee et al., Route Optimization for Mobile Nodes in Mobile Network based on Prefix Delegation, individual submission, Feb. 16, 2004, whole document.*
Johnson et al., RFC 3775, Mobility Support in IPv6, Jun. 2004, whole document.*
Soliman et al., RFC 5380, Hierarchical Mobile IPv6 (HMIPv6) Mobility Management, Oct. 2008, whole document.*
Thaler et al. (IAB Thoughts on IPv6 Network Address Translation), Jul. 2010, Internet Architecture Board (IAB), Request for Comments: 5902 (RFC 5902), whole document.*
Wasserman et al., IPv6-to-IPv6 Network Prefix Translation draft-mrw-nat66-16, Apr. 26, 2011, Network Working Group, pp. 1, 5, 12-14 (https://tools.ietf.org/html/draft-mrw-nat66-16).*
R. Droms, Ed., DNS Configuration options for Dynamic Host Configuration Protocol for IPv6 (DHCPv6), rfc3646, IETF Dec. 2003.
R. Droms, Stateless Dynamic Host Configuration Protocol (DHCP) Service for IPv6, rfc3736, IETF Apr. 2004.
Cable Television Laboratories, Inc., DOCSIS Set-top Gateway (DSG) Interface Specification, CM-SP-DSG-I17-110210, Feb. 10, 2011.
Cable Television Laboratories, Inc., IPv4 and IPv6 eRouter Specification, CM-SP-eRouter-I05-110210, Feb. 10, 2011.
R. Hinden et al., IP Version 6 Addressing Architecture, rfc4291, IETF Feb. 2006.
CISCO Systems, DHCP for IPv6 (RFC3315) At-A-Glance, Cisco Systems Inc. 2008.
Microsoft TechNet, DHCP Protocols, 2011, downloaded from http://technet.microsoft.com/en-us/library/dd145321(WS.10,printer)aspx on May 29, 2011.

* cited by examiner

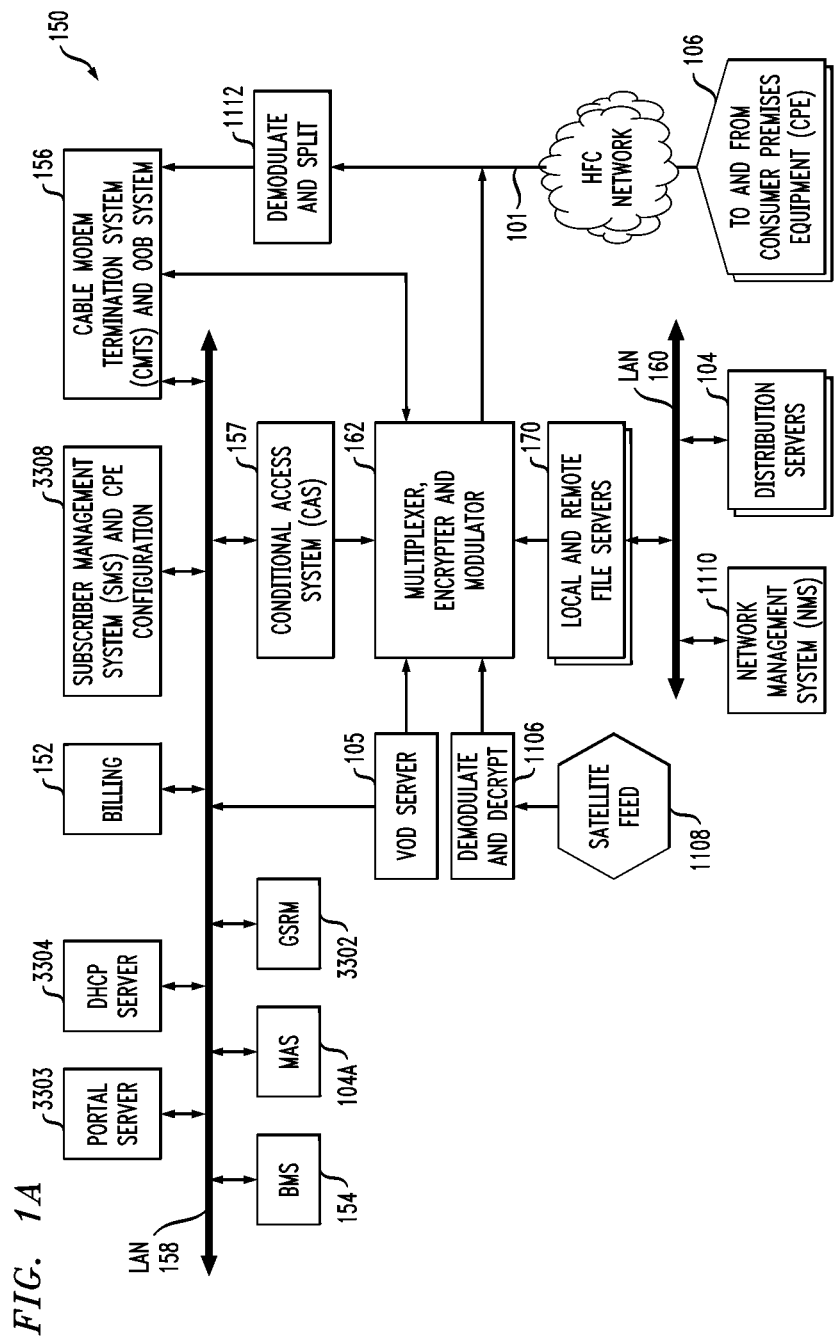

FIG. 4
PRIOR ART

| PREFIX | /48s | /56s | /64s | BITS |
|---|---|---|---|---|
| /24 | 16M | 4G | 1T | 104 |
| /25 | 8M | 2G | 512G | 103 |
| /26 | 4M | 1G | 256G | 102 |
| /27 | 2M | 512M | 128G | 101 |
| /28 | 1M | 256M | 64G | 100 |
| /29 | 512K | 128M | 32G | 99 |
| /30 | 256K | 64M | 16G | 98 |
| /31 | 128K | 32M | 8G | 97 |
| /32 | 64K | 16M | 4G | 96 |
| /33 | 32K | 8M | 2G | 95 |
| /34 | 16K | 4M | 1G | 94 |
| /35 | 8K | 2M | 512M | 93 |
| /36 | 4K | 1M | 256M | 92 |
| /37 | 2K | 512K | 128M | 91 |
| /38 | 1K | 256K | 64M | 90 |
| /39 | 512 | 128K | 32M | 89 |
| /40 | 256 | 64K | 16M | 88 |
| /41 | 128 | 32K | 8M | 87 |
| /42 | 64 | 16K | 4M | 86 |
| /43 | 32 | 8K | 2M | 85 |
| /44 | 16 | 4K | 1M | 84 |
| /45 | 8 | 2K | 512K | 83 |
| /46 | 4 | 1K | 256K | 82 |
| /47 | 2 | 512 | 128K | 81 |
| /48 | 1 | 256 | 64K | 80 |
| /49 | | 128 | 32K | 79 |
| /50 | | 64 | 16K | 78 |
| /51 | | 32 | 8K | 77 |
| /52 | | 16 | 4K | 76 |
| /53 | | 8 | 2K | 75 |
| /54 | | 4 | 1K | 74 |
| /55 | | 2 | 512 | 73 |
| /56 | | 1 | 256 | 72 |
| /57 | | | 128 | 71 |
| /58 | | | 64 | 70 |
| /59 | | | 32 | 69 |
| /60 | | | 16 | 68 |
| /61 | | | 8 | 67 |
| /62 | | | 4 | 66 |
| /63 | | | 2 | 65 |
| /64 | | | 1 | 64 |

IPv6 CHART
K=1,024
M=1,048,576
G=1,073,741,824
T=1,099,511,627,776

TECHNIQUES FOR ASSIGNING INTERNET PROTOCOL VERSION SIX NETWORK BLOCKS IN UNKNOWN NETWORKS

CROSS-REFERENCE TO RELATED APPLICATION(S)

This application claims the benefit of U.S. provisional application Ser. No. 61/495,357, filed on Jun. 9, 2011, the complete disclosure of which is expressly incorporated herein by reference in its entirety for all purposes.

FIELD OF THE INVENTION

The present invention relates generally to the electrical, electronic, and computer arts, and more particularly relates to network technology and the like.

BACKGROUND OF THE INVENTION

The great majority of the Internet currently utilizes Internet Protocol Version 4 (IPv4). The address space in IPv4 is becoming exhausted. The eventual exhaustion of the IPv4 address space was recognized some time ago and a common technique of dealing with it was developed. This technique employs network address translation (NAT) wherein a number of private IPv4 addresses, such as within a home or small business network, "hide" behind a single public IPv4 address.

Internet Protocol version 6 (IPv6) is a version of the Internet Protocol (IP) that is designed to succeed IPv4.

Currently, residences and small businesses obtain access to the Internet via a number of techniques. One example is by subscribing through a cable multiple system operator (MSO); such an MSO may provide a variety of services such as broadcast television, Video-On-Demand (VOD), broadband data services, IP telephony, and the like.

In this regard, with the advent of digital communications technology, many TV program streams are transmitted in digital formats. For example, Digital Satellite System (DSS), Digital Broadcast Services (DBS), and Advanced Television Standards Committee (ATSC) program streams are digitally formatted pursuant to the well-known Moving Pictures Experts Group 2 (MPEG-2) standard. The MPEG-2 standard specifies, among other things, the methodologies for video and audio data compression allowing for multiple programs, with different video and audio feeds, to be multiplexed in a transport stream traversing a single transmission channel. A digital TV receiver may be used to decode an MPEG-2 encoded transport stream, and extract the desired program therefrom.

The compressed video and audio data are typically carried by continuous elementary streams, respectively, which are broken into access units or packets, resulting in packetized elementary streams (PESs). These packets are identified by headers that contain time stamps for synchronizing, and are used to form MPEG-2 transport streams. For digital broadcasting, multiple programs and their associated PESs are multiplexed into a single transport stream. A transport stream has PES packets further subdivided into short fixed-size data packets, in which multiple programs encoded with different clocks can be carried. A transport stream not only includes a multiplex of audio and video PESs, but also other data such as MPEG-2 program specific information (sometimes referred to as metadata) describing the transport stream. The MPEG-2 metadata may include a program associated table (PAT) that lists every program in the transport stream. Each entry in the PAT points to an individual program map table (PMT) that lists the elementary streams making up each program. Some programs are open, but some programs may be subject to conditional access (encryption), and this information (i.e., whether open or subject to conditional access) is also carried in the MPEG-2 transport stream, typically as metadata.

The aforementioned fixed-size data packets in a transport stream each carry a packet identifier (PID) code. Packets in the same elementary streams all have the same PID, so that a decoder can select the elementary stream(s) it needs and reject the remainder. Packet-continuity counters may be implemented to ensure that every packet that is needed to decode a stream is received.

SUMMARY OF THE INVENTION

Techniques are provided for assigning internet protocol version six network blocks in unknown networks.

In one aspect, an exemplary method includes the steps of sending, from a gateway router apparatus, interposed between a premises network and an internet, a first multicast SOLICIT message with a prefix length hint based on a number of network segments associated with the gateway router apparatus; receiving, at the gateway router apparatus, a second multicast SOLICIT message, from a downstream router in the premises network; and recording, at the gateway router apparatus: (i) an estimated prefix length associated with the second multicast SOLICIT message; and (ii) an interface associated with the second multicast SOLICIT message. Further steps include receiving, at the gateway router apparatus, a first ADVERTISE message, over the internet; sending, from the gateway router apparatus, a REQUEST message, over the internet, the REQUEST message specifying a prefix length based on the number of network segments associated with the gateway router apparatus and the recorded estimated prefix length associated with the second multicast SOLICIT message; and sending, from the gateway router apparatus, a second ADVERTISE message advertising ability of the gateway router apparatus to delegate prefixes in accordance with the REQUEST message.

In still another aspect, a gateway router apparatus is provided for interposition between an internet and a premises network. The gateway router apparatus includes a memory and at least one processor, which is coupled to the memory. The gateway router apparatus further includes a persistent storage device, tangibly embodying in a non-transitory manner instructions which when loaded into the memory causes the at least one processor to carry out or otherwise facilitate performance of one or more method steps.

In yet another aspect, one step of an exemplary method includes sending, from a block-assigning router apparatus, a first multicast SOLICIT message with a prefix length hint based on a number of network segments associated with the block-assigning router apparatus. A further step includes receiving, at the block-assigning router apparatus: a second multicast SOLICIT message from an upstream router apparatus; and a third multicast SOLICIT message with a prefix length hint, from a downstream device. A further step includes recording, at the block-assigning router apparatus: a prefix length hint of the second multicast SOLICIT message; an interface associated with the second multicast SOLICIT message; the prefix length hint of the third multicast SOLICIT message; an interface associated with the third multicast SOLICIT message; and a first ADVERTISE message received from the upstream router apparatus. An even further step includes sending, from the block-assigning router apparatus, a REQUEST message, over the premises network. The REQUEST message specifies a prefix length based on the number of network segments associated with the block-assigning router apparatus and on the recorded prefix length hint of the third multicast SOLICIT message, but not on the recorded prefix length hint of the second multicast SOLICIT message. A still further step includes sending, from the block-assigning router apparatus, a second ADVERTISE message advertising ability of the block-assigning router apparatus to delegate prefixes in accordance with the REQUEST message.

In a still further aspect, a block-assigning router apparatus is provided for interposition between an upstream router apparatus and a downstream router apparatus. The block-assigning router apparatus includes a memory and at least one processor, which is coupled to the memory. The block-assigning router apparatus further includes a persistent storage device, tangibly embodying in a non-transitory manner instructions which when loaded into the memory causes the at least one processor to carry out or otherwise facilitate performance of one or more method steps, such as those described just above.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code for performing the method steps indicated. Furthermore, one or more embodiments of the invention or elements thereof can be implemented in the form of an apparatus including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein.

One or more embodiments of the invention can provide substantial beneficial technical effects, including, for example, ability to allocate addresses without requiring complex interaction with routing protocols or user intervention.

These and other features and advantages of the invention will become apparent from the following detailed description of illustrative embodiments thereof, which is to be read in connection with the accompanying drawings.

BRIEF DESCRIPTION OF THE DRAWINGS

FIG. 1A is a functional block diagram illustrating one exemplary HFC cable network head-end configuration;

FIG. 4 is a table depicting the number of /64 networks corresponding to each of a plurality of prefix lengths, as known in the prior art;

DETAILED DESCRIPTION OF PREFERRED EMBODIMENTS

Embodiments of the invention may be employed in a variety of settings. A non-limiting exemplary embodiment will be described within the context of a content-based network.

Figure 1:
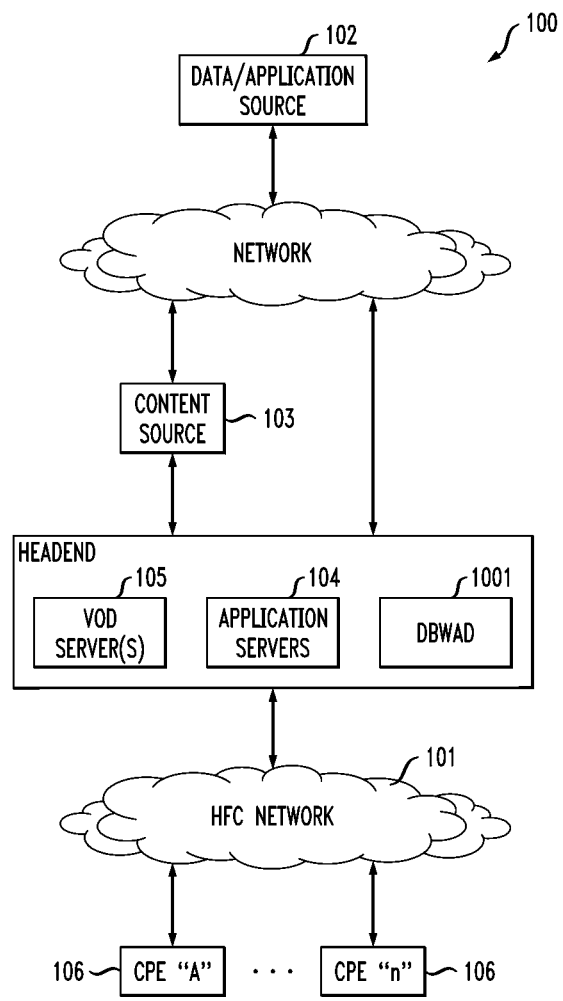
FIG. 1 is a functional block diagram illustrating an exemplary hybrid fiber-coaxial (HFC) network configuration.

FIG. 1 illustrates a typical content-based network configuration 100. The various components of the network 100 include (i) one or more data and application origination points 102; (ii) one or more content sources 103, (iii) one or more application distribution servers 104; (iv) one or more video-on-demand (VOD) servers 105, and (v) consumer (or customer) premises equipment (CPE) 106. In a preferred approach, at least some of the CPE 106 are home routers, home gateways, residential networking devices, and/or advanced wireless gateway apparatuses as described hereinafter and shown in FIGS. 2 and 3. Also included is a dynamic bandwidth allocation device (DBWAD) 1001 such as a global session resource manager, which is itself a non-limiting example of a session resource manager. The distribution server(s) 104, VOD servers 105, DBWAD 1001, and CPE(s) 106 are connected via a bearer (e.g., hybrid fiber cable (HFC)) network 101. A simple architecture is shown in FIG. 1 for illustrative brevity, although it will be recognized that comparable architectures with multiple origination points, distribution servers, VOD servers, and/or CPE devices (as well as different network topologies) may be utilized consistent with the invention. For example, the head-end architecture of FIG. 1A (described in greater detail below) may be used.

It should be noted at this point that in addition to a conventional HFC network or a switched digital network, other kinds of network access methods can be employed for network 101 (e.g., fiber-to-the-home (FTTH) or fiber-to-the-curb (FTTC); digital subscriber line (DSL); wireless networks such as Wi-Fi, WiMAX (Worldwide Interoperability for Microwave Access), 3GPP Long Term Evolution (LTE), various 4G standards; ISDN, dial-up (POTS) and the like). Again, for the avoidance of doubt, the HFC network details set forth herein are merely provided to show one non-limiting exemplary environment and it is to be emphasized that embodiments of the invention can be employed in many different situations where a gateway device or the like is interposed between: (i) the Internet or another Internet; and (ii) a premises or the like.

The data/application origination point 102 comprises any medium that allows data and/or applications (such as a VOD-based or "Watch TV" application) to be transferred to a distribution server 104 (for example, over a suitable network, not separately numbered). This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill.

The application distribution server 104 comprises a computer system where such applications can enter the network system. Distribution servers per se are well known in the networking arts.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the customers' premises (or other appropriate locations) that can be accessed by a distribution server 104; for example, set-top terminal (STT), digital set-top box (DSTB), set-top box (STB), or simply "box." and the like. As noted above, in a preferred approach, at least some of the CPE 106 are home routers, home gateways, residential networking devices, and/or advanced wireless gateway apparatuses as described hereinafter and shown in FIGS. 2 and 3.

Referring now to FIG. 1A, one exemplary embodiment of a head-end architecture is described. As shown in FIG. 1A, the head-end architecture 150 comprises typical head-end components and services including billing module 152, subscriber management system (SMS) and CPE configuration management module 3308, cable-modem termination system (CMTS) and out-of-band (OOB) system 156, as well as LAN(s) 158, 160 placing the various components in data communication with one another. It will be appreciated that while a bar or bus LAN topology is illustrated, any number of other arrangements (e.g., ring, star, etc.) may be used consistent with the invention. It will also be appreciated that the head-end configuration depicted in FIG. 1A is high-level, conceptual architecture and that each multi-service operator or multiple system operator (MSO) may have multiple head-ends deployed using custom architectures.

The architecture 150 of FIG. 1A further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (see FIG. 1B) via a variety of interposed network components.

Content (e.g., audio, video, etc.) is provided in each downstream (in-band) channel associated with the relevant service group. To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville Colo. 80027, USA) and associated protocols (e.g., DOCSIS 1.x, 2.0. or 3.0). The OpenCable™ Application Platform (OCAP) 1.0, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes. Other pertinent materials include the Data-Over-Cable Service Interface Specifications, IPv4 and IP v6 eRouter Specification (version 1.0 and any other versions), CM-SP-eRouter-105-110210, and the Data-Over-Cable Service Interface Specifications, DOCSIS Set-top Gateway (DSG) Interface Specification, CM-SP-DSG-117-110210, both available from Cable Television Laboratories, Inc. and both expressly incorporated herein by reference in their entireties for all purposes. Also expressly incorporated herein by reference in their entirety for all purposes are the following IETF specifications:

RFC 3315, "Dynamic Host Configuration Protocol for IPv6 (DHCPv6)"

RFC 3633, "IPv6 Prefix Options for Dynamic Host Configuration Protocol (DHCP) version 6"

RFC 3646, "DNS Configuration options for Dynamic Host Configuration Protocol for IPv6 (DHCPv6)"

RFC 3736, "Stateless Dynamic Host Configuration Protocol (DHCP) Service for IPv6"

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 1A are a global session resource manager (GSRM) 3302, a Mystro Application Server 104A, and a business management system 154, all of which are coupled to LAN 158. GSRM 3302 is one specific form of a DBWAD 1001 and is a non-limiting example of a session resource manager.

Figure 1B:
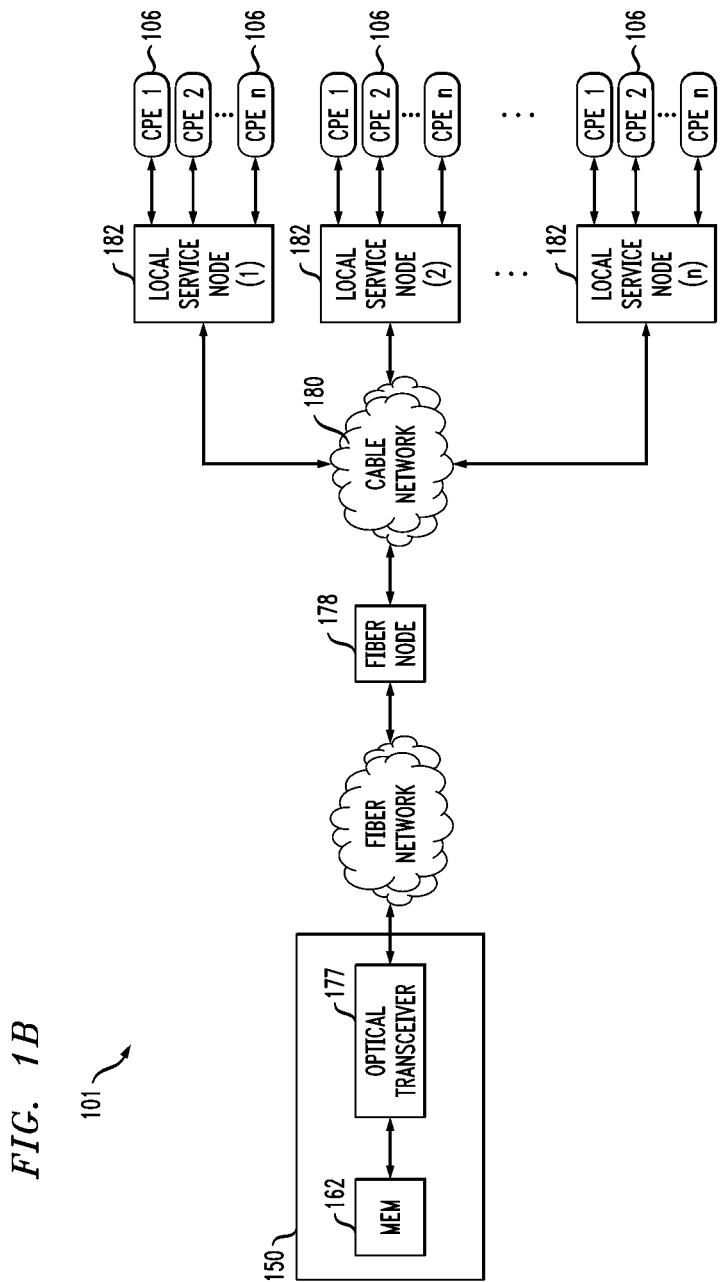
FIG. 1B is a functional block diagram illustrating one exemplary local service node configuration.

As shown in FIG. 1B, the network 101 of FIGS. 1 and 1A comprises a fiber/coax arrangement wherein the output of the MEM 162 of FIG. 1A is transferred to the optical domain (such as via an optical transceiver 177 at the head-end 150 or further downstream). The optical domain signals are then distributed to a fiber node 178, which further distributes the signals over a distribution network 180 to a plurality of local servicing nodes 182. This provides an effective 1:N expansion of the network at the local service end.

US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture useful with one or more embodiments of the present invention, although it will be recognized by those of ordinary skill that other approaches and architectures may be substituted. In a cable television system in accordance with the Brooks invention, program materials are made available to subscribers in a neighborhood on an as needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels which are no longer watched by the subscribers in the neighborhood.

Note that reference is made herein, for brevity, to features of the "Brooks invention"—it should be understood that no inference should be drawn that such features are necessarily present in all claimed embodiments of Brooks.

The Brooks invention is directed to a technique for utilizing limited network bandwidth to distribute program materials to subscribers in a community access television (CATV) system. In accordance with the Brooks invention, the CATV system makes available to subscribers selected program channels, as opposed to all of the program channels furnished by the system as in prior art. In the Brooks CATV system, the program channels are provided on an as needed basis, and are selected to serve the subscribers in the same neighborhood requesting those channels.

US Patent Publication 2010-0313236 of Albert Straub, entitled "TECHNIQUES FOR UPGRADING SOFTWARE IN A VIDEO CONTENT NETWORK," the complete disclosure of which is expressly incorporated herein by reference for all purposes, provides additional details on the aforementioned dynamic bandwidth allocation device.

US Patent Publication 2009-0248794 of William L. Helms, entitled "SYSTEM AND METHOD FOR CONTENT SHARING," the complete disclosure of which is expressly incorporated herein by reference for all purposes, provides additional details on CPE in the form of a converged premises gateway device. Related aspects are also disclosed in US Patent Publication 2007-0217436 of Markley et al, entitled "METHODS AND APPARATUS FOR CENTRALIZED CONTENT AND DATA DELIVERY," the complete disclosure of which is expressly incorporated herein by reference for all purposes.

Figure 2:
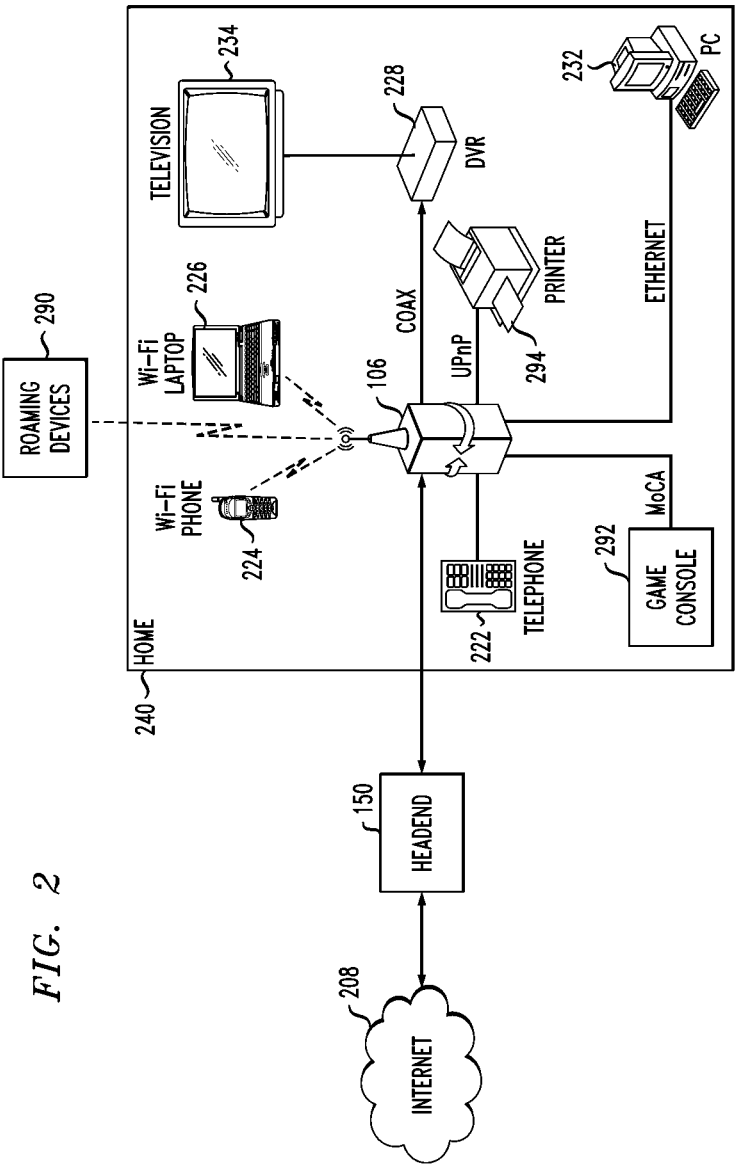
FIG. 2 is a functional block diagram of a content and data distribution network configured in accordance with one embodiment of the invention.

Reference should now be had to FIG. 2, which presents a block diagram of a premises network interfacing with a head end of an MSO or the like, providing Internet access. An exemplary advanced wireless gateway comprising CPE 106, incorporating aspects of the invention, is depicted as well.

CPE 106 includes an advanced wireless gateway which connects to a head end 150 or other hub of a network, such as a video content network of an MSO or the like. The head end is coupled also to an internet (e.g., the Internet) 208 which is located external to the head end 150, such as via an Internet (IP) backbone or gateway (not shown).

The head end is in the illustrated embodiment coupled to multiple households or other premises, including the exemplary illustrated household 240. In particular, the head end (for example, a cable modem termination system thereof) is coupled via the aforementioned HFC network and local coaxial cable or fiber drop to the premises, including the consumer premises equipment (CPE) 106. The exemplary CPE 106 is in signal communication with any number of different devices including, e.g., a wired telephony unit 222, a Wi-Fi or other wireless-enabled phone 224, a Wi-Fi or other wireless-enabled laptop 226, a session initiation protocol (SIP) phone, an H.323 terminal or gateway, etc. Additionally, the CPE 106 is also coupled to a digital video recorder (DVR) 228 (e.g., over coax), in turn coupled to television 234 via a wired or wireless interface (e.g., cabling, PAN or 802.15 UWB micro-net, etc.). CPE 106 is also in communication with a network (here, an Ethernet network compliant with IEEE Std. 802.3, although any number of other network protocols and topologies could be used) on which is a personal computer (PC) 232.

Other non-limiting exemplary devices that CPE 106 may communicate with include a printer 294; for example over a universal plug and play (UPnP) interface, and/or a game console 292; for example, over a multimedia over coax alliance (MoCA) interface.

CPE 106 is also in signal communication with one or more roaming devices, generally represented by block 290. Communication with such devices will be discussed in greater detail below.

A "home LAN" (HLAN) is created in the exemplary embodiment, which may include for example the network formed over the installed coaxial cabling in the premises, the Wi-Fi network, and so forth.

During operation, the CPE 106 exchanges signals with the head end over the interposed coax (and/or other, e.g., fiber) bearer medium. The signals include e.g., Internet traffic, digital programming and other digital signaling or content such as digital (packet-based; e.g., VoIP) telephone service. The CPE 106 then exchanges this digital information after demodulation and any decryption (and any demultiplexing) to the particular system(s) to which it is directed or addressed. For example, in one embodiment, a MAC address or IP address can be used as the basis of directing traffic within the client-side environment 240.

Any number of different data flows may occur within the network depicted in FIG. 2. For example, the CPE 106 may exchange digital telephone signals from the head end which are further exchanged with the telephone unit 222, the Wi-Fi phone 224, or one or more roaming devices 290. The digital telephone signals may be IP-based such as Voice-over-IP (VoIP), or may utilize another protocol or transport mechanism. The well known session initiation protocol (SIP) may be used, for example, in the context of a "SIP phone" for making multi-media calls. The network may also interface with a cellular or other wireless system, such as for example a 3G IMS (IP multimedia subsystem) system, in order to provide multimedia calls between a user or consumer in the household domain 240 (e.g., using a SIP phone or H.323 terminal) and a mobile 3G telephone or personal media device (PMD) user via that user's radio access network (RAN).

The CPE 106 may also exchange Internet traffic (e.g., TCP/IP and other packets) with the head end 150 which is further exchanged with the Wi-Fi laptop 226, the PC 232, one or more roaming devices 290, or other device. CPE 106 may also receive digital programming that is forwarded to the DVR 228 or to the television 234. Programming requests and other control information may be received by the CPE 106 and forwarded to the head end as well for appropriate handling.

Figure 3:
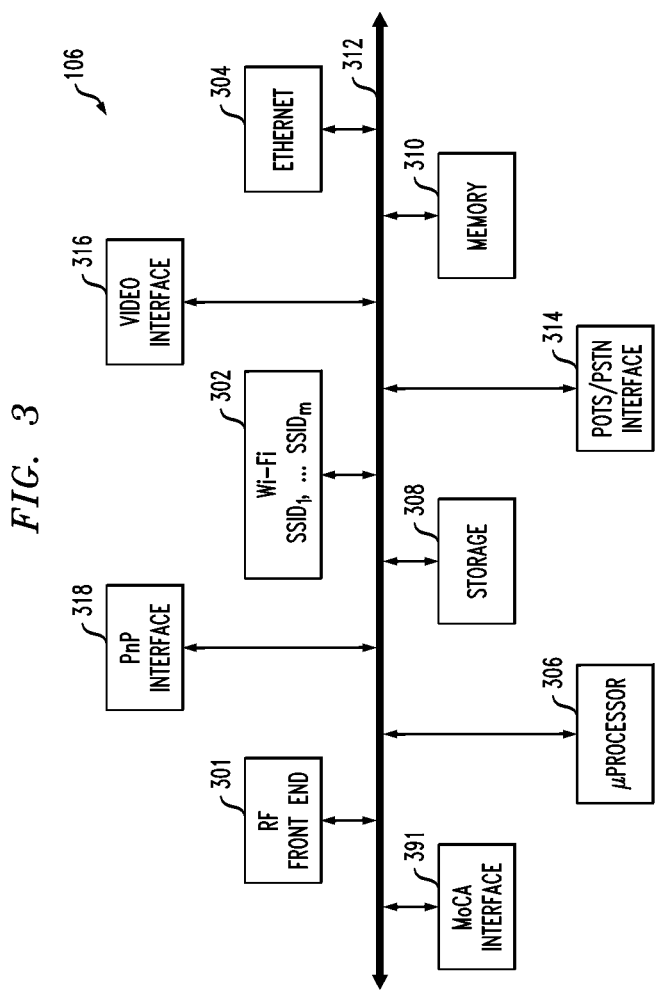
FIG. 3 is a functional block diagram of an exemplary centralized CPE unit configured in accordance with one embodiment of the invention.

FIG. 3 is a block diagram of one exemplary embodiment of the CPE 106 of FIG. 2. The exemplary CPE 106 includes an RF front end 301, Wi-Fi interface 302, video interface 316, "Plug n' Play" (PnP) interface 318 (for example, a UPnP interface) and Ethernet interface 304, each directly or indirectly coupled to a bus 312. As will be discussed further below, in one or more embodiments, Wi-Fi interface 302 comprises a single wireless access point (WAP) running multiple ("m") service set identifiers (SSIDs). For the avoidance of doubt, in one or more embodiments, multiple SSIDs, which could represent different applications, are served from a common WAP. For example, SSID 1 is for the home user, while SSID 2 may be for a managed security service, SSID 3 may be a managed home networking service, SSID 4 may be a hot spot, and so on. Each of these is on a separate IP subnetwork for security, accounting, and policy reasons. The microprocessor 306, storage unit 308, plain old telephone service (POTS)/public switched telephone network (PSTN) interface 314, and memory unit 310 are also coupled to the exemplary bus 312, as is a suitable MoCA interface 391. The memory unit 310 typically comprises a random access memory (RAM) and storage unit 308 typically comprises a hard disk drive, an optical drive (e.g., CD-ROM or DVD), NAND flash memory, RAID (redundant array of inexpensive disks) configuration, or some combination thereof.

The illustrated CPE 106 can assume literally any discrete form factor, including those adapted for desktop, floor-standing, or wall-mounted use, or alternatively may be integrated in whole or part (e.g., on a common functional basis) with other devices if desired.

Every embodiment need not necessarily have all the elements shown in FIG. 3.

It will be recognized that while a linear or centralized bus architecture is shown as the basis of the exemplary embodiment of FIG. 3, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

It will also be recognized that the CPE configuration shown is essentially for illustrative purposes, and various other configurations of the CPE 106 are consistent with other embodiments of the invention. For example, the CPE 106 in FIG. 3 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

A suitable number of standard 10/100/1000 Base T Ethernet ports for the purpose of a Home LAN connection are provided in the exemplary device of FIG. 3; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0) ports, and IEEE-1394 (Firewire) ports. S-video and other signal interfaces may also be provided if desired.

During operation of the CPE 106, software located in the storage unit 308 is run on the microprocessor 306 using the memory unit 310 (e.g., a program memory within or external to the microprocessor). The software controls the operation of the other components of the system, and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

The RF front end 301 of the exemplary embodiment comprises a cable modem of the type known in the art. In this fashion, content or data normally streamed over the cable modem can be received and distributed by the CPE 106, such as for example packetized video (e.g., IPTV). The digital data exchanged using RF front end 301 includes IP or other packetized protocol traffic that provides access to Internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 240 (or outside this environment by way of a gateway or portal) via, e.g. the Wi-Fi interface 302, Ethernet interface 304 or plug-and-play (PnP) interface 318.

It will be appreciated, however, that the RF front end 301 of the CPE may comprise (either in addition to or in place of the cable modem) a traditional video RF front end 301 (e.g., tuner) adapted to receive video signals over, e.g., a QAM. For example, one exemplary embodiment of the RF front end 301 comprises one or more tuners, a demodulator, decryption module, and demultiplexer of the type well known in the art, although other configurations may be used. Additionally, the RF front end 301 modulates, encrypts/multiplexes as required, and transmits digital information for receipt by upstream entities such as the CMTS or a network server. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std 1394), USB/USB2, or any number of other such options.

Other devices such as portable music players (e.g., MP3 audio players) may be coupled to the CPE 106 via any number of different interfaces, and music and other media files downloaded for portable use and viewing.

In some instances, the CPE 106 includes a DOCSIS cable modem for delivery of traditional broadband Internet services. This connection can be shared by all Internet devices in the premises 240; e.g. Internet protocol television (IPTV) devices, PCs, laptops, etc., as well as by roaming devices 290. In addition, the CPE 106 can be remotely managed (such as from the head end 150, or another remote network agent) to support appropriate IP services.

In some instances the CPE 106 also creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver data and applications to other devices in the home such as PCs, PMDs, media extenders and set-top boxes. The coaxial network is merely the bearer; devices on the network utilize Ethernet or other comparable networking protocols over this bearer.

The exemplary CPE 106 shown in FIGS. 2 and 3 acts as a Wi-Fi access point (AP), thereby allowing Wi-Fi enabled devices to connect to the home network and access Internet, media, and other resources on the network.

In one embodiment, Wi-Fi interface 302 comprises a single wireless access point (WAP) running multiple ("m") service set identifiers (SSIDs). One or more SSIDs can be set aside for the home network while one or more SSIDs can be set aside for roaming devices 290.

A premises gateway software management package (application) is also provided to control, configure, monitor and provision the CPE 106 from the cable head-end 150 or other remote network node via the cable modem (DOCSIS) interface. This control allows a remote user to configure and monitor the CPE 106 and home network.

The MoCA interface 391 can include, for example, a MoCA, retail compliant F-connector for providing data over coax capability. The exemplary MoCA port operates in the 1125-1525 MHz band, although other frequencies (MoCA compliant or otherwise) may be used for this purpose if desired. The MoCA frequencies can be multiplexed onto the cable input port of the CPE 106, or sent over another channel (e.g., dedicated channel or interface). The CPE 106 also optionally includes a switched packet interface between the Ethernet port and the MoCA interface. In one embodiment, data traffic flows through the CPE 106 between the Ethernet or other network interface and MoCA ports. In some cases, this occurs without requiring host processor intervention; in other instances, host processor intervention is a possibility. The CPE 106 may include switched or routed processing between, e.g., Ethernet and/or MoCA and/or Wi-Fi, without limitation. In other words, it is possible for two (or more) Ethernet ports to be switched, meaning the gateway only looks at the layer two address to forward out the correct interface, or bridged, meaning the gateway forwards all packets from all Ethernet ports out all Ethernet ports, or routers, meaning the gateway examines the destination IP address to determine which port to forward. For instance, multiple Ethernet interfaces might only be counted as a single Ethernet domain, thus getting a single IPv6 prefix.

As discussed above, the exemplary Wi-Fi wireless interface 302 is also configured to provide a plurality of unique service set identifiers (SSIDs) simultaneously. These SSIDs are configurable (locally or remotely), such as via a web page.

As alluded to elsewhere herein, in a non-limiting exemplary embodiment, one or more techniques for assigning internet protocol version six network blocks in unknown networks are implemented in the context of an advanced wireless gateway (AWG) and/or downstream routers. Other embodiments can be implemented in different contexts. As also discussed elsewhere herein, the IPv4 address space is becoming exhausted.

An IPv6 Network can be thought of as a fixed /64 size including $2^{64}$ (18,446,744,073,709,551,616) IPv6 addresses (more accurately, an IPv6 Network is a minimum size of /64 (as generally used), but it is just as valid to refer to a /48 network). FIG. 4 shows the number of /64 networks to each of the listed prefix lengths. As depicted therein, the following prefixes have the following meanings:

K=1,024
M=1,048,576
G=1,073,741,824
T=1,099,511,627,776

The notation "/" refers to the number of bits in the given prefix. That is, the size of a block of addresses is indicated by a slash (/) and the decimal size of the network prefix; the specific addresses in the block are not explicitly specified in this approach. For example, an address block with 48 bits in the prefix is indicated by /48. Such a block contains $2^{128-48}=2^{80}$ addresses. The smaller the numerical value of the network prefix, the larger the size of the block, since the prefix is subtracted from 128 to obtain the exponent to which two is raised to determine the number of available addresses. For example, a /56 prefix is four times larger than a /58 prefix ($2^{128-56}=2^{72}$ addresses; $2^{128-58}=2^{70}$ addresses; $2^{72}=2^{70} \times 4$).

The skilled artisan will be familiar with IPv4 and IPv6 per se. IPv6 specifies a new packet format, designed to minimize packet header processing by routers. IPv6 includes a larger address space, enhanced multicasting, stateless address autoconfiguration (SLAAC), mandatory support for network layer security, simplified processing by routers, enhanced mobility, options extensibility, and support for so-called "jumbograms."

As noted, the advanced wireless gateway is but one exemplary aspect; for example, one or more embodiments can be employed in the context of a wired home gateway that communicates over MoCA, wireless, Ethernet, and other techniques. Indeed, interfaces may include wired and/or wireless, and even interfaces currently not yet existing could make use of one or more techniques disclosed herein. Accordingly, while in some instances, techniques disclosed herein can be applied to an advanced wireless gateway wherein the MSO has a direct relationship with the vendor who supplies the gateway, in other cases, techniques disclosed herein can be applied to retail devices where the MSO does not have a direct vendor relationship to drive the implementation. There is enough flexibility in the design of one or more embodiments that aspects of the invention could be used by any number of service providers, including potentially telephony companies, wireless-only Internet Service Providers (ISPs), and the like.

In some instances, depending on the architecture, embodiments of the invention can be employed in connection with set-top boxes (STBs); for example, a gateway STB which is, in essence, another form of data gateway that delivers video or re-encapsulates IP. In some instances, use can be made of the MoCA interface within a video architecture for distribution within a home or similar premises (e.g., a small business).

It is worth noting that typical current home routers employ IPv4 private address space behind a NAT/NAPT process to share one public IPv4 address among many privately addressed devices. Despite the imminent exhaustion of the IPv4 address space, there is no shortage of IPv4 private address space inside the home, since millions of addresses have been designated as such, but the same address range cannot be used both inside and outside the home. However, in the case of IPv6, all the address space inside the home is globally unique, i.e., it is globally scoped address space. Thus, unlike in IPv4 where there is a network address translation (NAT) layer to convert the private address space to a public IPv4 address, so that access to the global Internet is available, in IPv6, all of the addresses are globally unique and there is no need for NAT. Eliminating the need to maintain a NAT significantly simplifies implementation of the network interface.

Thus, one or more embodiments deliver services to a customer's network; the expectation is that the customer has a network, or that an entity such as an MSO or the like is giving the customer equipment to build one. Heretofore, the customer might have a network, but the network was really being treated as a PC behind a cable modem.

It should be noted that one or more embodiments of the invention can be implemented in a variety of hardware platforms, and the block diagrams herein are a non-limiting example.

As noted, it is envisioned that the IPv6 protocol will at first augment and eventually replace the IPv4 protocol currently in use as the remaining blocks of IPv4 address space become completely exhausted. A non-limiting exemplary embodiment makes use of an advanced wireless gateway in the form of an approved DOCSIS 3.0 cable modem with gateway router functions. Such equipment could, for example, be supplied to customers of an MSO. In some instances, customers with certain levels of service could receive such devices before other customers.

Prefix Delegation (PD) is the process of providing a customer with a prefix that is large enough to allow the customer to further sub-divide the customer's leased prefix into individual networks within the customer's home or office Local Area Network (LAN) environment.

Some embodiments employ DHCP-PD (dynamic host control protocol-prefix delegation) servers of an MSO or the like. DHCP-PD servers could be located anywhere within the MSO access network, by way of example and not limitation in a head end 150 (e.g., DHCP server 3304 on LAN 158 but could also be on LAN 160), data center, or the like. Furthermore, in cases of sub-prefix delegation, the router itself (and possibly downstream routers) will have a DHCP server running on it/them. Thus, the DHCP server can be in the head end, data center, or the premises (e.g., in the case of sub-delegation).

Many instances address a situation where the advanced wireless gateway or similar device acts as both an "edge" facing the MSO or the like and a "core" serving all clients within the customer home network. In some cases, additional routers within the customer's network will typically request a prefix to be delegated to them from the advanced wireless gateway or similar device. Many routers will supply a "hint" in their request for how large a network they wish to receive. One or more embodiments provide techniques by which the advanced wireless gateway or similar device will use the hint information to round up or down in order to supply a specific sub-prefix to the downstream router that is appropriate based on the size of the prefix delegated to the advanced wireless gateway or similar device itself.

One or more non-limiting exemplary embodiments are applicable to small-scale small office and/or home networks. However, aspects of an exemplary framework can be scaled from very small to very large proportions.

Home networks are arbitrarily complex; an MSO or other ISP or similar entity typically does not know how many routers are in the home when IP addresses are assigned. In IPv4, it is assumed that the home gateway will get a single IPv4 address, and use NAT to share that address among all devices in the home. Any router behind that NAT will also use NAT. In IPv6, it is assumed that all devices will have globally unique IPv6 addresses. Without knowing the size of the network, an MSO or other ISP or similar entity does not know how much address space to assign to the home, and each router in the home does not know how much space to delegate to routers downstream of it.

With routers supporting multiple interfaces (several wireless SSIDs 302, MoCA 391, and Ethernet ports 304 which may be routed or bridged), customers cascading existing routers (including network storage devices) and an expectation that mobile devices (handsets, MiFi (line of compact wireless routers produced by Novatel Wireless, San Diego, Calif., USA that act as mobile Wi-Fi hotspots.)) will increasingly act as routers, home networks are becoming increasingly complex.

Co-assigned U.S. patent application Ser. No. 13/157,285 of inventors Kirk Erichsen, Lee Howard, and Ken Gould, entitled "TECHNIQUES FOR PREFIX SUBNETTING" filed on Jun. 9, 2011, the complete disclosure of which is expressly incorporated herein by reference in its entirety for all purposes, discloses aspects of "hierarchical prefix delegation," where each router delegates prefixes evenly among its interfaces.

One or more embodiments of the present invention advantageously are able to handle networks that are several interfaces wide and several routers deep.

One or more embodiments of the present invention provide a dynamic mechanism where each router delegates only as much space as is needed to the router downstream of it.

RFC3315, Dynamic Host Configuration Protocol for IPv6 (DHCPv6) and RFC3633, IPv6 Prefix Options for Dynamic Host Configuration Protocol (DHCP) version 6, both available from the Internet Engineering Task Force (IETF), both of which are expressly incorporated herein by reference in their entireties for all purposes, explain the basic functions of DHCPv6 and DHCPv6 prefix delegation. Stateless Address Auto-Configuration (SLAAC) is also used to determine IPv6 addresses dynamically, but it has no function to handle prefixes.

One or more embodiments can be employed in a variety of contexts; for example, any router used in a home network could use one or more embodiments. Small business networks and even enterprise networks could also use one or more embodiments. However, larger enterprise networks typically have network administrators configuring their routers, and often have multiple external networks, so there is no single "top level" edge router. It is believed that one or more embodiments are particularly useful in cases where there is in fact such a top-level edge or gateway router.

The skilled artisan will appreciate that, in DHCPv6:
  a SOLICIT message is sent by a client to locate servers;
  an ADVERTISE message is sent by a server in response to a SOLICIT message to indicate availability;
  a REQUEST message is sent by a client to request addresses or configuration settings from a server;
  a REPLY message is sent by a server to a client in response to a SOLICIT, REQUEST, RENEW, REBIND, INFORMATION-REQUEST, CONFIRM, RELEASE, or DECLINE message; and
  a RECONFIGURE message is sent by a server to a client to indicate that the server has new or updated configuration settings.

In one or more embodiments, all routers needing an IPv6 prefix (block of IPv6 addresses) send DHCPv6 SOLICIT messages to find DHCP servers, with a hint about the prefix size needed. Each router preferably adds up the hints, and then sends a DHCP REQUEST for a prefix that is large enough.

Default DHCPv6 prefix behavior is for a router to send a SOLICIT message to the All_DHCP_Relay_Agents_and_Servers multicast address, to solicit a prefix delegation. Any device (such as a CMTS or DHCP server) capable of prefix delegation replies with an ADVERTISE message. If multiple responses are heard, the router chooses one and sends a REQUEST for a prefix, and the server sends a REPLY with an address prefix and any other parameters.

A router that needs to know how big a prefix to REQUEST will tally all of the SOLICITS that it sees, so that it knows how big a prefix to SOLICIT. In one or more embodiments, the following sequence of steps can be employed. In one step, the router counts its own network segments; that is to say, how many /64 prefixes it needs for itself. The router rounds up to the nearest prefix. In another step, the router sends a SOLICIT to the IPv6 All_DHCP_Relay_Agents_and_Servers multicast address with a prefix length hint. The router does not include the local link in the hint count. In a further step, meanwhile, when the router hears a SOLICIT, it records the hint and the interface it heard the SOLICIT from. Furthermore, in an additional step, when the router hears an ADVERTISE, it subtracts the hints associated with devices on that interface. In yet a further step, the router REQUESTs a prefix that can handle the sum of SOLICIT hints received on any interface other than the interface where the ADVERTISE came from. The router then ADVERTISEs its ability to delegate prefixes, as previously SOLICITED.

In one or more embodiments, timer control is employed, so the gateway does not REQUEST a PD (prefix delegation) before it has received all of the downstream REQUESTs. After hearing a SOLICIT, the gateway does not REQUEST anything yet, but waits 2×SOL_TIMEOUT before sending a new SOLICIT upstream. This will delay provisioning, but help to ensure that the right size prefix is obtained.

One or more embodiments advantageously employ loop detection, to reduce or eliminate the possibility of SOLICITs stacking up to infinity, potentially starving another router. In one or more embodiments, this can be controlled by ISP local policy (no more than a /48 prefix, for example). In an alternative approach, the ISP has a router include (as an option) all the DUIDs (unique routers sending SOLICIT messages—DHCP Unique Identifier (DUID)) it represents in its SOLICIT.

In another aspect, /64 prefixes are assigned as sparsely as possible; if each router acts as a DHCP_Relay, the root gateway router can assign adjacent /64 prefixes to them. All of the relaying routers then decrement the prefix length they advertise via ROUTER ADVERTISEMENT.

Figure 5:
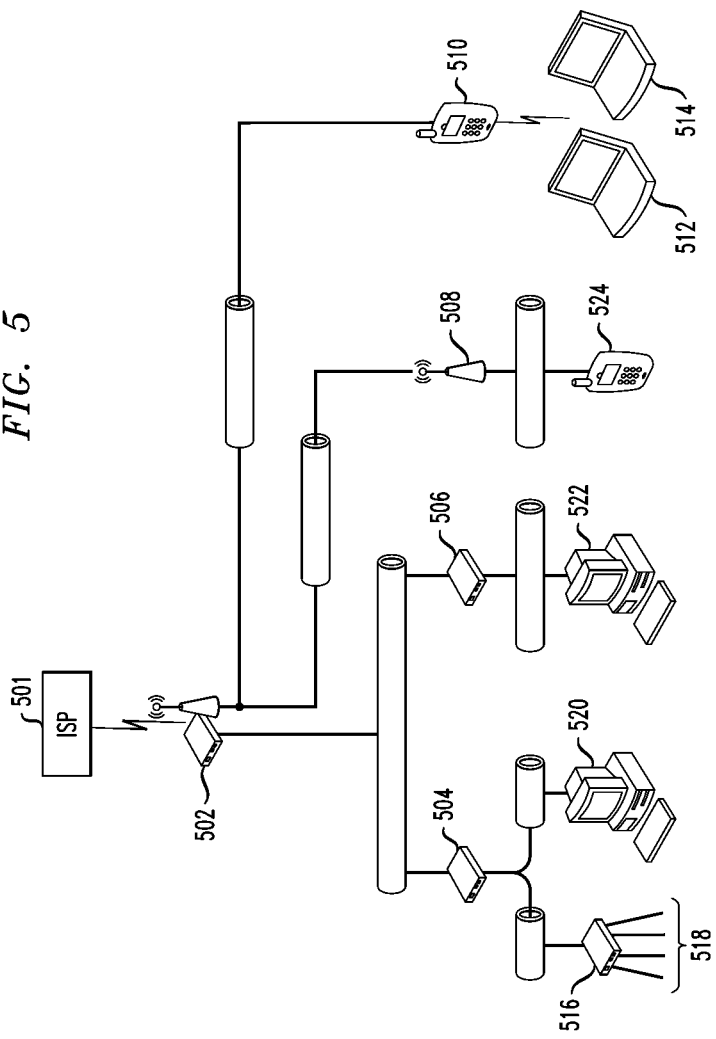
FIG. 5 shows an exemplary premises network, according to an aspect of the invention.

Reference should now be had to FIG. 5 for a non-limiting example. Device 502 is a combination edge or gateway router and wireless access point with two SSIDs. Devices 504 and 506 are (downstream) routers connected to device 502. Device 508 is another wireless access point, and device 510 is a wireless device which also acts as a router ("MiFi" or Personal Area Network device) for two laptops 512, 514. Device 516 is another router, which has four Ethernet interfaces 518, and which is connected to device 504.

At initialization, devices 502, 504, 506, 508, 510, and 516 will all detect the number of ports attached (see discussion of steps 702, 704 below). Device 502 will SOLICIT (see discussion of step 706 below) for a /62 prefix, or four /64 prefixes, for the four interfaces it has, namely, the two SSIDs 508, 510; upstream to ISP 501; and for the Ethernet with two devices 504, 506. In this regard, note further that one is subtracted from the total number of interfaces, to avoid counting the upstream interface which will delegate. Thus, 4−1=3 interfaces is the final count but this is rounded back up to 4 in accordance with the table of FIG. 4. That is, 3 /64 prefixes are asked for but this is rounded back up to 4 /64 prefixes. Device 502 sends the SOLICIT message out on all four interfaces, including upstream. Device 504 will SOLICIT for a /62 prefix, rounding up for its three interfaces (i.e., upstream to 502 and downstream to device 516 and PC 520). Device 506 will solicit for a /64 prefix, reflecting its upstream interface and its downstream interface to PC 522 (two total less one to account for upstream=1 /64).

By way of further explanation, device 506 has two interfaces, but when sending a SOLICIT to find a DHCP server, and ultimately when sending a REQUEST, it only counts the other interfaces. Said another way: 502 and 506 share a link; since 502 is the upstream, it will provide the network allocation for that link, so 506 only needs to number the downstream. More specifically, 502 may assign 2001:db8:1234:5678::/64 to the 504/506 link. 504 will assign itself an address from that prefix, maybe 2001:db8:1234:5678:1234:5678:9876:4321. 506 will assign itself a different address from the same prefix, maybe 2001:db8:1234:5678:9876:5432:1234:5678. 504 and 506 still need a network block for the links/segments downstream of them.

Device 508 will solicit for a /64 prefix, reflecting its upstream interface and its downstream interface to smart phone (or similar wireless device) 524. Device 510 will solicit for a /64 prefix, reflecting its upstream interface and its downstream interface to laptops 512, 514. Devices 512 and 514 are not routers and share a single interface with one /64 block for all devices connected to that interface. Again, subtract one for the upstream interface as before.

By way of further explanation, 510 has two interfaces: a Wifi SSID it uses to reach 502, and a different Wifi SSID (or Bluetooth, or the like) it uses to reach 512 and 514. But since 512 and 514 are devices, not routers, they each get a /128 address, not a network block. This distinction varies depending on connection type. Ethernet allows multiple devices on one physical segment, but that could mean that a router (502) has one physical Ethernet port with a layer 2 switch somewhere downstream of it, or it has two physical Ethernet ports which are logically one segment (the switch is built in this is common in home networks).

Device 516 will solicit for a /62 prefix, reflecting its upstream interface and its four downstream Ethernet interfaces 518; yet again, subtract one for the upstream interface. Once more, by way of further explanation, do not count the upstream interface. More specifically, count all interfaces, subtract one, and send a SOLICIT out all interfaces for that prefix size. When an ADVERTISE is heard, send the REQUEST for (n−1)/64, where n is the number of interfaces.

At this point, no router has a prefix to offer, except the ISP 501. The ISP ADVERTISEs its DHCP capability (see step 708 below), and device 502 knows "which way is up." That is to say, in an initialization state, the device does not know what the upstream interface is, but rather counts all the interfaces and subtracts one from the total, knowing that it has an upstream interface. Then it sends the SOLICIT out all interfaces and at whichever port it receives the ADVERTISE, such port is known to be the upstream interface. A REQUEST with a hint with the actual requested size is ultimately sent out the upstream interface. Device 502, hearing solicitations from devices 504, 506, 508, 510 (see step 710 below), adds them together and "thinks" it needs a prefix to accommodate a /62 (502 for itself)+/63 (504's SOLICIT)+/64 (506)+/64 (508)+/64 (510). However, device 502 waits in case it hears another SOLICIT (see step 724 below), Device 504, hearing the solicitation of device 516, adds the need of device 516 to its own need, and SOLICITs for a sufficiently large prefix (see step 726 below).

By way of an aside with further explanation about device 502 knowing which way is up, there are multiple routers trying to get addresses assigned. All of them speak DHCPv6, but none should respond to queries until it has a prefix. At initialization, only the ISP has a prefix, so it ADVERTISEs that capability. Now the home gateway 502 knows it has connectivity to the ISP (or at least an upstream with a DHCP prefix), so it adds together all the requests it has heard, and REQUESTs that size. Once it has a prefix, it ADVERTISEs downstream, so all other routers figure out which way is "upstream."

Now continuing, device 502 hears the new solicit of device 504, subtracts the original SOLICIT hint of device 504 (identified by the DUID) (/62) and adds the new hint (/61). However, device 502 waits in case it hears another SOLICIT. Device 502 then sends a SOLICIT for 61+62+64+62=/59.

Consider the likely case where all devices do not initialize at the same time. If a router comes up after other devices have initialized, it will count its interfaces and send a SOLICIT out all interfaces as before. It will receive an ADVERTISE from any adjacent routers. However, since it is new, when it sends a REQUEST with its prefix size, the upstream router may not have a large enough prefix to give it, and will have to REQUEST a new prefix upstream. The REQUESTer may include its existing prefix in its request, with a greater prefix length. When it receives a new prefix, it will send a RECONFIGURE to all downstream devices, with their new prefix assignments.

For example, if all devices in FIG. 5 except 516 were activated and configured, and then 516 was added:

1. 516 would count its (n−1) interfaces, and send a DHCP SOLICIT for a /62 out all interfaces
2. 504 would ADVERTISE its ability to assign a prefix, even though it only has a /63
3. 516 would REQUEST a /62 from 504
4. 504 would SOLICIT, then REQUEST a /61 (=/62+/63) from 502.
   a. 504 might request the same prefix it previously had, but with a larger prefix length (/61 instead of /63)
5. If 502 did not have an available /61, it would SOLICIT and REQUEST a block from the ISP.
   a. If 502 was able to accommodate the same prefix with a /61 size, it should.

It will be appreciated that one or more embodiments are useful in the case of a home gateway (implemented at least in part, say, with a Linksys router or a Netgear router in the home). The router does not know right away how many devices are on the network. Currently, everything is IPv4 and it is expected that a router only has one address facing upstream, i.e. facing the Internet. The router may have multiple addresses downstream of that, deeper into the home, and then the router carries out NAT to share the many downstream addresses with the one upstream address.

With the use of IPv6, there is an expectation that address sharing will not be employed because there are so many addresses. Furthermore, when the customer connects the home gateway router to another router, a mechanism is needed so that the downstream home gateway router knows to obtain multiple addresses. It is easy for the downstream router to obtain one address just like any computer connected to the home LAN; however, obtaining multiple addresses with current techniques is challenging.

It will be appreciated that a router typically obtains a block of addresses (a network prefix), while an individual host obtains a single address. A router obtains a bloc, as opposed to a single address, because it connects multiple devices and it therefore needs a pool of addresses to draw from. One or more embodiments allow the home gateway that connects to an MSO or other ISP to "know" how many addresses to give to any given downstream router. There is currently an available field in the DHCPv6 protocol that allows for the provision of a "hint." In particular, RFC 3633, expressly incorporated herein by reference in its entirety for all purposes, defines the packet format for the IA_PD Prefix Option. The Prefix Option can be used in the SOLICIT and REQUEST DHCPv6 packets to provide additional information about the request.

The format of the IA_PD Prefix option is:

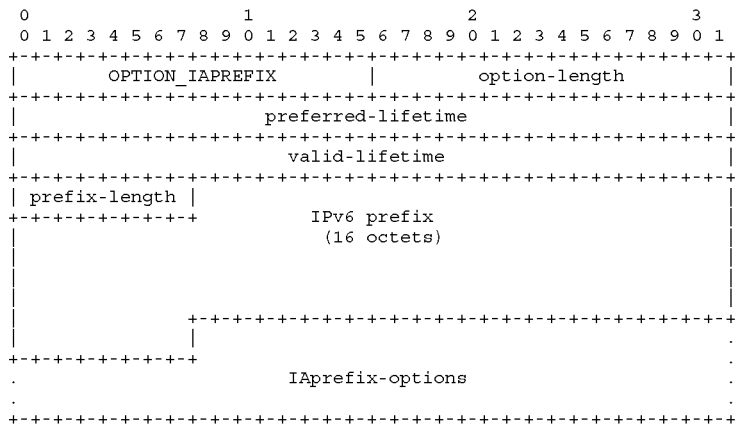

Thus, a REQUESTing router could set prefix-length=63 and/or IPv6 Prefix=2001:db8:1234:560:: for example. The use of the prefix-length field in the SOLICIT/REQUEST messages is colloquially known as the "hint."

If a device hints for a given prefix size, one issue is how to know whether the upstream router has a large enough prefix to give the requested prefix size. One or more embodiments implement an additive technique to count up the number of requests obtained and add those together; this in turn indicates how big a block is required. In essence, a given router listens to other routers in the network; listens to whatever size the other routers hint for; and in turn uses this information to decide how big a hint to give. In one or more instances, the gateway router adds all the requests together and that is the block size it requests.

Thus, in one or more embodiments, the routers make use of the "hinting" process to determine what block size to request.

It is worth noting that in IPv6, there is a 128 bit address, a string of ones and zeroes 128 bits long. The first half of that address is a network prefix. The second half is the suffix. The suffix allows for billions of possible addresses, so in on aspect, all a router needs to know is that for every given LAN segment there is a /64 segment, the first half of the address, which is the network prefix. As long as half of the address has been used for a network prefix, it is possible to be quite confident that there will not be so many devices on that LAN segment such that the /64 segment will not be adequate. Therefore, the protocol specs (RFC 4291, expressly incorporated herein by reference in its entirety for all purposes) specify assignment of a /64 prefix size to each network segment, so all the router has to do is count up its ports and "say" in effect "I have four Ethernet ports; therefore. I need four /64 segments; i.e., I need four network prefixes appropriate for four LANs." That is how the router decides how many to get. Then, once the router has those blocks, it listens for DHCP requests from individual devices on the LAN and gives out addresses one by one. Note that RFC 4291 requires "All Global Unicast addresses other than those that start with binary 000 have a 64-bit interface ID field (i.e., n+m=64)." Elsewhere in that RFC it requires the unicast address to use EUI-64 for the host bits, which means only 64 bits remain.

By way of example, if a router has four ports then the hint size it transmits to the network is based on the number of ports and not necessarily the number of devices that are actually utilized on the ports.

It is worth discussing the case where a router has, say, 16 ports but only 10 devices being utilized thereon. In one or more embodiments, this situation does not really matter.

However, in some instances, it may be useful to observe that there is a way the router could know this. In particular, there is a layer two protocol called neighbor discovery used by IPv6; it is a protocol that can be thought of as fitting in between layer two and layer three. In some instances, device hosts, i.e., individual devices, may send out discovery packets saying "I am here and here is my address"; the router hears those packets as well and is able to keep a state table saying "here is how many devices I have on my network." But, as noted, this should not matter because the way IPv6 is architected, each LAN segment has billions of possible addresses.

In one or more embodiments, information as to the number of ports and/or the him size, i.e., how many addresses are going to be needed, is gathered in a systematic fashion. In one or more instances, the number of ports is counted and then that number is used to hint upstream for an allocation of the corresponding size.

It is worth noting that most of the time in IPv4, a router may have four Ethernet ports but it treats them all as if they are one logical port. So, the router may have a block of, say 255 addresses (in IPv4 this corresponds to a /24) but the router will just bridge all traffic on any of those ports to any of the other ports; the router just automatically passes the packets in between all four ports. In complex networks of the future with multiple routers in the home, this type of approach is believed to be less likely. On the contrary, it is believed that routed ports, where each network has its own network prefix, are preferred for home and small business networks of the future, rather than bridging all the networks to each other.

It has been found in laboratory experiments that certain current IPv6 home gateways are not able to handle being cascaded; when this is attempted with current techniques, it was found that the downstream router did not obtain a network prefix. One or more embodiments are advantageously implemented by software upgrades to existing routers, wherein additional code is provided instructing the router to count We number of interfaces and provide a DHCPv6 REQUEST hinting at the size prefix desired. In one or more instances, every gateway also supports prefix delegation. Currently, home gateway manufacturers assume that there will only be hosts, i.e., PCs and devices, on a home network, not downstream routers. In one or more embodiments, the DHCP prefix delegation function and the adding up of the number of ports to determine the number of prefixes needed are both supported.

Figure 6:
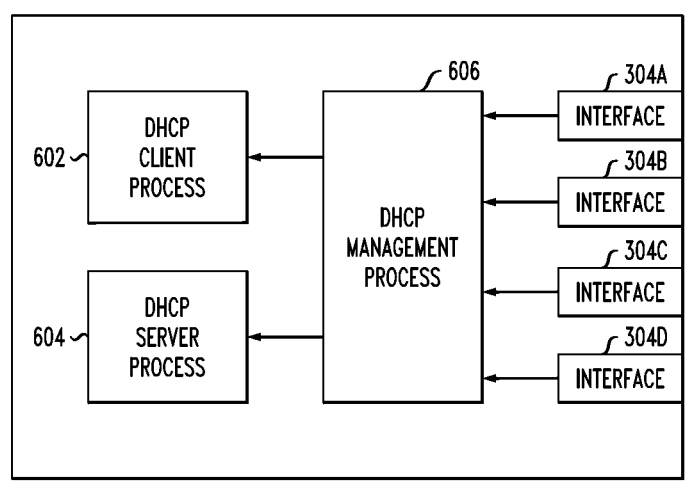
FIG. 6 shows an exemplary block diagram, according to an aspect of the invention.

FIG. 6 presents a block diagram showing how one or more embodiments can be implemented in the gateway 106 or similar device (continued reference should also be had to FIG. 3). Note Ethernet ports 304A, 304B, 304C, and 304D; the gateway router 106 will add them up and send a request. In one or more embodiments, processor 306 is provided inside of the gateway and one or more ports are connected to the processor (such as via bus 312). A routine running on the processor 306 provides instructions for counting up the number of ports, changing the hint field in the prefix request, and sending it upstream to allocate a number of blocks of addresses large enough to cover the number of devices. In one or more embodiments the routine includes DHCP client process 602, DHCP server process 604, and DHCP management process 606. The functionality of each process is explained with respect to FIGS. 7A and 7B below. It will be appreciated that other routers implementing aspects of the invention (other than the gateway or edge router) may be configured with a similar software architecture. The gateway or other router acts as a client to upstream nodes and a server to downstream nodes. For example, the gateway is a client to the DHCP server 3304 in the head end of the MSO (or similar server of other ISP); the gateway is also a server to the downstream devices. Immediately downstream routers act as clients to the gateway, and act as servers to further downstream routers, and so on. In one or more embodiments, the processes 602, 604, 606 are implemented as distinct software modules, stored in a non-transitory manner in storage 308, and loaded into memory 310 to cause processor 306 to carry out the method steps indicated. Thus, in a non-limiting exemplary embodiment, an advanced wireless gateway or similar device includes, in terms of hardware, four-port Ethernet switch 304, MoCA interface 391, and multiple SSIDs 302 supporting a wireless access point. The software processes run on top of the physical ports associated with the switch 304, physical MoCA interface 391, RF interface 301, and wireless access point 302 and its associated radios. Thus, in one or more embodiments, the software processes are stored in persistent storage 308 and when the gateway boots, the software is loaded into memory 310 causing microprocessor 306 to configure the interfaces and ports in accordance with the described logic.

Advantageously, one or more embodiments do not need to make certain assumptions about how the network will be assembled (such as reserving a block of prefixes and saying in effect that this block will be used on these ports and this other block will be used on these other ports). In one or more embodiments, a more dynamic approach is implemented wherein information is actually gathered about what the requirement is for network prefix assignment rather than assuming some knowledge of the downstream topology. It is believed that one or more embodiments will therefore scale better to a larger network.

It should be noted that language such as "sending your SOLICIT; "it knows how big a prefix to SOLICIT"; and the like, is not intended to necessarily imply any human agency.

Figure 7A:
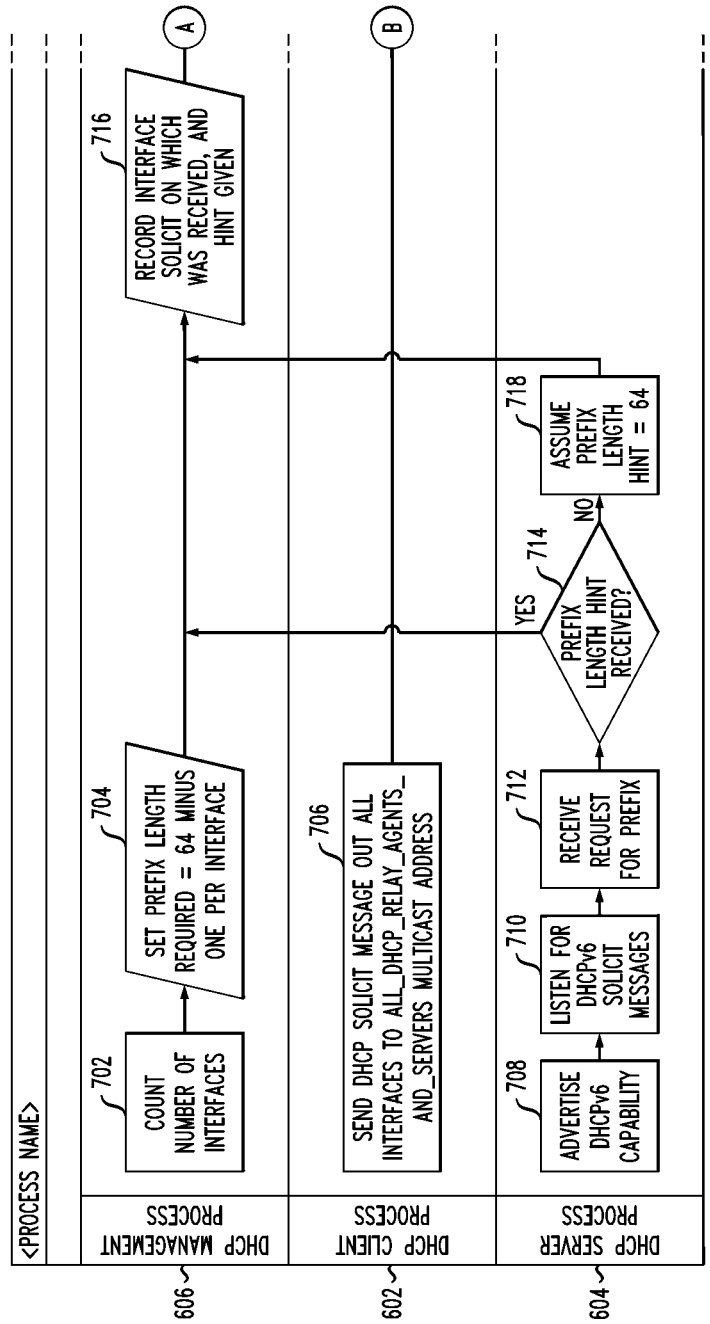
FIGS. 7A and 7B show an exemplary flow chart, according to an aspect of the invention.
Figure 7B:
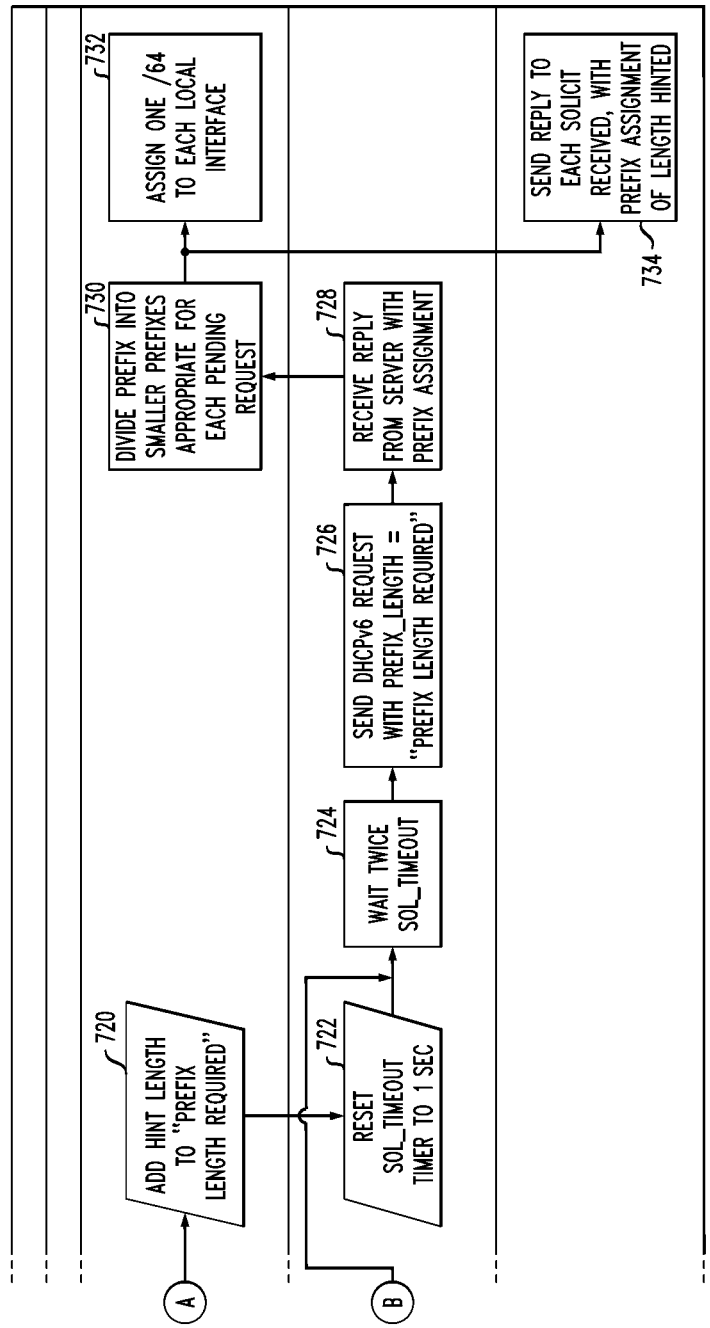

FIGS. 7A and 7B show a flow chart of exemplary method steps, according to an aspect of the invention. In step 702, DHCP management process 606 counts the number of interfaces for a given router. In step 704, DHCP management process 606 sets the prefix length required to 64 minus one per interface (i.e., when counting interfaces, don't include the one you're sending your SOLICIT on; when sending a REQUEST, don't include the interface you're sending the REQUEST on; and when figuring out how many /64s you need, count interfaces and subtract one). Meanwhile, in step 706, DHCP client process 602 sends a DHCP SOLICIT message out all the interfaces to the All_DHCP_Relay_Agents_and_Servers multicast address, to discover an available DHCPv6 server. Furthermore, in step 708, the DHCP server process 604 advertises the router's DHCPv6 capability; and in step 710, listens for DHCPv6 SOLICIT messages. Other DHCP clients on the network may send DHCP SOLICIT messages; in that case, the DHCP server process 604 receives a Request for Prefix in step 712. Then, in decision block 714, DHCP server process 604 determines whether a prefix length hint was received. If so, logical flow proceeds directly to step 716, wherein the DHCP management process 606 records the interface on which the SOLICIT was received as well as the hint. On the other hand, if a prefix length hint was not received, logical flow proceeds to step 718, wherein the DHCP server process 604 assumes the prefix length hint to be 64, and then logical flow proceeds to step 716 as before.

In step 720, DHCP management process 606 adds the hint length to the prefix length required previously set in step 704. In step 722, DHCP client process 602 resets the SOL_Timeout timer to a suitable value; in one or more non-limiting exemplary embodiments, set to one second which is the RFC 3315 default value. In step 724. DHCP client process 602 waits for a period of time equal to twice the value of SOL_Timeout; in step 726, DHCP client process 602 sends a DHCPv6 REQUEST with the value of prefix_length equal to "Prefix length required" from step 720. In step 728. DHCP client process 602 receives a reply from the server with the prefix assignment. In step 730. DHCP management process 606 divides the assigned prefix into smaller prefixes appropriate for each pending REQUEST. In step 732, DHCP management process 606 assigns one /64 prefix to each local interface. In step 734. DHCP server process 604 sends a REPLY to each SOLICIT received, with a prefix assignment of the length hinted (or a value of 64 assumed in step 718 if no hint was received). The association of processes with steps herein is exemplary.

Recapitulation

Given the discussion thus far, it will be appreciated that, in general terms, an exemplary method, according to an aspect of the invention, includes the step of sending (see e.g., step 706), from a gateway router apparatus (see e.g. 106, 502), interposed between a premises network and an internet, a first multicast SOLICIT message with a prefix length hint based on a number of network segments associated with the gateway router apparatus (e.g., 64 minus one per interface as discussed above—when counting interfaces, don't include the one you're sending your SOLICIT on; when sending a REQUEST, don't include the interface you're sending the REQUEST on; and when figuring out how many /64s you need, count interfaces and subtract one). The method also includes receiving, at the gateway router apparatus, a second multicast SOLICIT message (see e.g., step 710) from a downstream router (e.g., 504 or 506) in the premises network. In some instances, the gateway router apparatus responds with an ADVERTISE message (step 708), and may receive a REQUEST message from the downstream router (see e.g. step 712). The method still further includes recording, at the gateway router apparatus (see e.g., step 716):

an estimated prefix length associated with the second multicast SOLICIT message (as explained below, can be a hint or a default value such as /64 if no hint is received); and an interface associated with the second multicast SOLICIT message.

Further steps include receiving, at the gateway router apparatus, a first ADVERTISE message (for example from step 708 being performed by the ISP), over the internet; and sending, from the gateway router apparatus, a REQUEST message (see e.g., step 726), over the internet. The REQUEST message specifies a prefix length based on the number of network segments associated with the gateway router apparatus and the recorded estimated prefix length associated with the second multicast SOLICIT message (which was added in step 720; as discussed above, the interface on which the first ADVERTISE message was received is subtracted out; the language "estimated prefix length associated with the second multicast SOLICIT message" is intended to encompass such subtraction). An even further step includes sending, from the gateway router apparatus, a second ADVERTISE message (see e.g., step 708) advertising ability of the gateway router apparatus to delegate prefixes in accordance with the REQUEST message.

In some cases (e.g., "NO" branch of block 714), the second multicast SOLICIT message does not have a second multicast SOLICIT message prefix length hint. In such cases, as at 718, the estimated prefix length associated with the second multicast SOLICIT message is taken as a default value, such as, for example, a value of /64.

On the other hand, the second multicast SOLICIT message may have a second multicast SOLICIT message prefix length hint (e.g., "YES" branch of block 714), and in such cases, the estimated prefix length associated with the second multicast SOLICIT message is the second multicast SOLICIT message prefix length hint.

Further steps can include, for example, receiving, at the gateway router apparatus, a REPLY message, as at 728, over the internet, in accordance with the REQUEST message. The REPLY message has a prefix assignment. A further step 730 can include dividing the prefix assigned in the REPLY message; and a still further step 732 can include assigning each local interface of the gateway router a prefix of default length. An even further step 734 includes sending a REPLY message from the gateway router apparatus to the downstream router with a prefix assignment in accordance with the second multicast SOLICIT message prefix length hint.

In one or more embodiments, the prefix length hint of the first multicast SOLICIT message is calculated by determining a total number of interfaces of the gateway router apparatus, as at 702; subtracting one from the total number of interfaces of the gateway router apparatus to obtain a first result (N1), as at 704; and setting the prefix length hint of the first multicast SOLICIT message as a number of /64 prefixes in accordance with the first result. As used herein, referring to FIG. 4, setting in accordance with the first result includes (i) asking for N1 /64 prefixes if N1 /64 prefixes yields an exact prefix size, and asking for the next highest exact prefix size if N1 /64 prefixes do not yield an exact prefix size. For example, if N1 is two, ask for N1 /64s, that is, two /64s=one /63. On the other hand, if N1 is three, there is no prefix corresponding exactly to three /64s, so ask for a /62 which can actually accommodate four /64s.

In one or more embodiments, the prefix length specified in the REQUEST message is calculated, as at 720, by adding to the first result the second multicast SOLICIT message prefix length hint to obtain a second result (N2); and setting the prefix length specified in the REQUEST message as a number of /64 prefixes in accordance with the second result. As used herein, referring to FIG. 4, setting in accordance with the second result includes (i) asking for N2 /64 prefixes if N2 /64 prefixes yields an exact prefix size, and asking for the next highest exact prefix size if N2 /64 prefixes do not yield an exact prefix size. For example, if N2 is two, ask for N2 /64s, that is, two /64s=one /63. On the other hand, if N2 is three, there is no prefix corresponding exactly to three /64s, so ask for a /62 which can actually accommodate four /64s.

As explained, for example, with respect to steps 722 and 724, in some cases, an additional step includes the gateway router apparatus waiting a predetermined time period prior to sending the REQUEST message in step 726, in order to allow sufficient time to receive, at the gateway router apparatus, pertinent communications from downstream thereof (e.g., more SOLICITs from downstream device(s)).

In some cases, as discussed elsewhere with respect to the possibility of switching or bridging two or more Ethernet ports, in some cases, in the step of determining the total number of interfaces of the gateway router apparatus, at least one of the interfaces includes multiple interfaces treated as a single interface.

As discussed further below, any of the methods disclosed herein can include the additional step of providing a system, wherein the system in turn includes distinct software modules. Each of the distinct software modules is embodied in a non-transitory manner on a tangible, computer-readable, recordable storage medium, and the distinct software modules include a dynamic host control management process module, a dynamic host control client process module, and a dynamic host control server process module. "Computer-readable" in this context includes a medium readable by a gateway router or other router. In such instances, the method steps can be carried out by the corresponding one of the distinct software modules executing on at least one hardware processor of the gateway router apparatus or other router, as the case may be. FIGS. 7A and 7B indicate which steps are performed by which modules, based on the alignment of the steps with the headings 602, 604, 606. Thus, steps 702, 704, 716, 712, 730, and 732 are performed by the dynamic host control management process module; steps 706, 722, 724, 726, and 728 are performed by the dynamic host control client process module; and steps 708, 710, 712, 714, 718, 734 are performed by the dynamic host control server process module.

In at least some instances, the three processes may run in parallel so that at least some steps may be performed in parallel.

Additional steps will now be considered from the perspective of a downstream router. For the avoidance of semantic confusion, consider the above-mentioned REQUEST message as a first REQUEST message. One additional step includes sending, from the downstream router, the second multicast SOLICIT message. The prefix length hint of the second multicast SOLICIT message is based on a number of network segments associated with the downstream router (e.g., 64 minus one per interface as discussed above—when counting interfaces, don't include the one you're sending your SOLICIT on; when sending a REQUEST, don't include the interface you're sending the REQUEST on; and when figuring out how many /64s you need, count interfaces and subtract one). A further step includes receiving, at the downstream router:

the first multicast SOLICIT message; and
a third multicast SOLICIT message with a prefix length hint, from a still further downstream router (see e.g., 516) in the premises network (e.g., from step 706 performed by the further downstream router)

An even further step includes recording, at the downstream router (e.g., step 716 performed by downstream router which ignores (subtracts out) hints from devices on the interface where the ADVERTISE was received):

the prefix length hint of the first multicast SOLICIT message;
an interface associated with the first multicast SOLICIT message;
the prefix length hint of the third multicast SOLICIT message;
an interface associated with the third multicast SOLICIT message; and
what port the second ADVERTISE message was received on.

Even further steps include receiving, at the downstream router, the second ADVERTISE message, over the premises network; and sending, from the downstream router, a second REQUEST message (see e.g., step 726 performed by downstream router), over the premises network. The second REQUEST message specifies a prefix length based on the number of network segments associated with the downstream router and on the recorded prefix length hint of the third multicast SOLICIT message, but not on the recorded prefix length hint of the first multicast SOLICIT message (because it arrived on the interface where the ADVERTISE message was received). A still further step includes sending, from the downstream router, a third ADVERTISE message (see e.g., step 708 performed by downstream router) advertising ability of the downstream router to delegate prefixes in accordance with the second REQUEST message.

In some cases, the prefix length hint of the second multicast SOLICIT message is calculated, as at 702, by determining a total number of interfaces of the downstream router; as at 704, subtracting one from the total number of interfaces of the downstream router to obtain a third result (N3); and setting the prefix length hint of the second multicast SOLICIT message as a number of /64 prefixes in accordance with the third result. As used herein, referring to FIG. 4, setting in accordance with the third result includes (i) asking for N3 /64 prefixes if N3 /64 prefixes yields an exact prefix size, and asking for the next highest exact prefix size if N3 /64 prefixes do not yield an exact prefix size. For example, if N3 is two, ask for N3 /64s, that is, two /64s=one /63. On the other hand, if N3 is three, there is no prefix corresponding exactly to three /64s, so ask for a /62 which can actually accommodate four /64s.

Furthermore, in some cases, the prefix length specified in the second REQUEST message is calculated by adding to the third result the third multicast SOLICIT message prefix length hint to obtain a fourth result (N4), as at 720; and setting the prefix length specified in the second REQUEST message as a number of /64 prefixes in accordance with the fourth result. As used herein, referring to FIG. 4, setting in accordance with the fourth result includes (i) asking for N4 /64 prefixes if N4 /64 prefixes yields an exact prefix size, and asking for the next highest exact prefix size if N4 /64 prefixes do not yield an exact prefix size. For example, if N4 is two, ask for N4 /64s, that is, two /64s=one /63. On the other hand, if N4 is three, there is no prefix corresponding exactly to three /64s, so ask for a /62 which can actually accommodate four /64s.

In another aspect, as noted elsewhere herein, in some cases, the home router simply relays requests to an external server (for example, DHCP server 3304 in FIG. 1A). At least the home router is interposed between a premises network and an internet. The external server could be on the ISP's network (e.g., in the head end as shown in connection with DHCP server 3304). One or more of the downstream devices (e.g. 516) still implement the techniques shown in FIGS. 7A and 7B.

In still another aspect, a gateway router apparatus 502, 106 is provided for interposition between an internet and a premises network. The gateway router apparatus includes a memory 310 and at least one processor 306, which is coupled to the memory. The gateway router apparatus further includes a persistent storage device 308, tangibly embodying in a non-transitory manner instructions which when loaded into the memory causes the at least one processor to carry out or otherwise facilitate performance of one or more method steps.

In yet another aspect (which may be thought of as a series of method steps from the perspective of a device in the premises network), one step includes sending, from a block-assigning router apparatus (e.g. 504), a first multicast SOLICIT message with a prefix length hint based on a number of network segments associated with the block-assigning router apparatus. The notation "block-assigning router apparatus" is used to distinguish from a gateway or a further downstream device. A further step includes receiving, at the block-assigning router apparatus: a second multicast SOLICIT message from an upstream router apparatus (e.g., 502); and a third multicast SOLICIT message with a prefix length hint, from a downstream device (e.g., 518). A further step includes
- recording, at the block-assigning router apparatus:
- a prefix length hint of the second multicast SOLICIT message;
- an interface associated with the second multicast SOLICIT message;
- the prefix length hint of the third multicast SOLICIT message;
- an interface associated with the third multicast SOLICIT message; and
- a first ADVERTISE message received from the upstream router apparatus.

An even further step includes sending, from the block-assigning router apparatus, a REQUEST message, over the premises network. The REQUEST message specifies a prefix length based on the number of network segments associated with the block-assigning router apparatus and on the recorded prefix length hint of the third multicast SOLICIT message, but not on the recorded prefix length hint of the second multicast SOLICIT message. A still further step includes sending, from the block-assigning router apparatus, a second ADVERTISE message advertising ability of the block-assigning router apparatus to delegate prefixes in accordance with the REQUEST message.

In a still further aspect, a block-assigning router apparatus 504 (can be configured similar to pertinent aspects of 106) is provided for interposition between an upstream router apparatus 502 and a downstream router apparatus 516. The block-assigning router apparatus includes a memory and at least one processor, which is coupled to the memory. The block-assigning router apparatus further includes a persistent storage device, tangibly embodying in a non-transitory manner instructions which when loaded into the memory causes the at least one processor to carry out or otherwise facilitate performance of one or more method steps (e.g. those described just above). Again, the notation "block-assigning router apparatus" is used to distinguish from a gateway or a further downstream router.

The method and apparatus discussed in connection with the block-assigning router apparatus can be used in the case when the gateway router apparatus 502 functions in accordance with aspects of the invention, as described elsewhere herein, or can be used in the case when the home router simply relays requests to an external server (for example, DHCP server 3304 in FIG. 1A) as described above.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, which when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). Appropriate interconnections via bus, network, and the like can also be included.

In some instances, a portal server 3303 in head end 150 (shown on LAN 158 but could also be on LAN 160) is employed; for example, aspects of configuration information and/or aspects of a user interface could be located on portal server 3303. Appropriate configuration information could be pushed down to the router in some instances.

Many aspects of the invention can be implemented, for example, on an advanced wireless gateway or similar device, as shown in FIG. 3, with suitable software layers to implement logic as described herein. Some aspects of the invention may involve a server or other general purpose computer.

Home gateways generally perform the role of DHCP server. In the ISP network, general-purpose hardware servers are DHCP servers; a CMTS may relay the DHCP request to the DHCP server. However, there are some implementations of a general-purpose computer being a DHCP server or home gateway. Most versions of Linux come with DHCP server software on them, and many come with router software. Windows Server can be a DHCP server, and can be configured to route. Some home gateways (notably by Linsys and Netgear, usually with a model number including "WRT") can run open source versions of home gateway software (OpenWRT or DD-WRT, for instance). It is theoretically possible for the home router to relay requests to a server. This could be implemented, for example, with some manual configuration (or a new signaling protocol to designate the server authoritative for the home network). Instead of counting all of the prefixes and handing them out, it would only send its own REQUEST to the server, and relay any others it received. This could pose routing problems in some cases. The server could be on the home network, or in the ISP's network (e.g., the head-end).

FIG. 11 is a block diagram of a system 2100 that can implement some pertinent aspects or processes, processor 2120 of which is representative of processors associated with servers, clients, set top terminals or gateways 106, DBWAD, SRM, GSRM, MAS 104A, personal media devices, portal server 3303, DHCP server 3304, smart phones, desktop or laptop computers, smart roaming devices, and any other elements with processing capability depicted in the other figures. In one or more embodiments, inventive steps are carried out by one or more of the processors in conjunction with one or more interconnecting network(s). Again, in some cases, most or all steps are carried out, or at least facilitated by, the advanced wireless gateway of FIG. 3 or a device with similar functionality.

Figure 8:
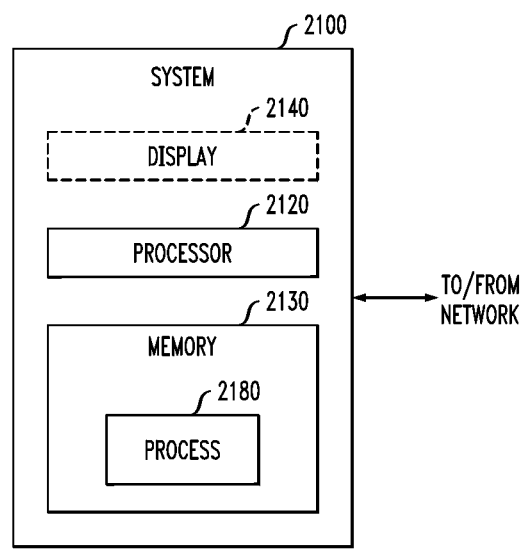
FIG. 8 is a block diagram of an exemplary computer system useful in implementing at least a portion of one or more embodiments of the invention.

As shown in FIG. 8, memory 2130 configures the processor 2120 to implement one or more aspects of the methods, steps, and functions disclosed herein (collectively, shown as process 2180 in FIG. 8). The memory 2130 could be distributed or local and the processor 2120 could be distributed or singular. The memory 2130 could be implemented as an electrical, magnetic or optical memory, or any combination of these or other types of storage devices. It should be noted that if distributed processors are employed, each distributed processor that makes up processor 2120 generally contains its own addressable memory space. It should also be noted that some or all of computer system 2100 can be incorporated into an application-specific or general-use integrated circuit. For example, one or more method steps could be implemented in hardware in an ASIC rather than using firmware. Display 2140 is representative of a variety of possible input/output devices (e.g., mice, keyboards, printers, etc.).

As is known in the art, part or all of one or more aspects of the methods and apparatus discussed herein may be distributed as an article of manufacture that itself includes a computer readable medium having computer readable code means embodied thereon. The computer readable program code means is operable, in conjunction with a computer system including hardware, to carry out all or some of the steps to perform the methods or create the apparatuses discussed herein. The computer readable medium may be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. As used herein, a tangible computer-readable recordable storage medium is intended to encompass a recordable medium which stores instructions and/or data in a non-transitory manner, examples of which are set forth above, but is not intended to encompass a transmission medium or disembodied signal.

The computer systems and servers described herein each contain a memory that will configure associated processors to implement the methods, steps, and functions disclosed herein. Such methods, steps, and functions can be carried Out, e.g. by processing capability on individual elements in the other figures, or by any combination thereof. The memories could be distributed or local and the processors could be distributed or singular. The memories could be implemented as an electrical, magnetic or optical memory, or any combination of these or other types of storage devices. Moreover, in some instances (e.g., the portal server), the term "memory" encompasses any information able to be read from or written to an address in the addressable space accessed by an associated processor. With this definition, information on a network is still within a memory because the associated processor can retrieve the information from the network.

Thus, elements of one or more embodiments of the present invention can make use of computer technology with appropriate instructions to implement method steps described herein.

As used herein, including the claims, a "server" includes a physical data processing system (for example, system 2100 as shown in FIG. 8) running a server program. It will be understood that such a physical server may or may not include a display, keyboard, or other input/output components.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include, for example, a DHCP management process module, a DHCP client process module, and a DHCP server process module; any or all of the software components shown in the figures can be implemented with suitable modules. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules. In one or more embodiments, the code is stored in a non-transitory manner.

It is possible that some aspects of the invention could be implemented as a "cloud" service—"CPE as a Service" or "Cloud CPE." There would still be a physical gateway in the home, with all the physical interfaces, but the processing and storage could be done on servers located at the ISP.

Non-limiting examples of languages that may be used include C/C++, assembly language, Pascal. Java, EBIF—Extended Binary Interchange Format language, UNIX shell scripts (for example, to generate information to supply to the GSRM), and the like. Note that EBIF would typically only be employed in connection with a set-top box. RTSP and/or RPC can be employed for interface protocols, for example. Some aspects of the invention involve storage of data (e.g., how many prefixes have been requested), which may be stored in RAM, disk, or flash memory; or could be stored in XML (or HTML, etc.). In theory, non-limiting examples of useful database software include Access® software (registered mark of Microsoft Corporation, Redmond, Wash., USA); Oracle® software (registered mark of Oracle International Corporation, 500 Oracle Parkway, Redwood City, Calif. 94065, USA); Informix® software (registered mark of International Business Machines Corporation, Armonk, N.Y., USA); and structured query language (SQL) software available from many sources, including Microsoft Corporation, Redmond, Wash., USA). However, in one or more embodiments, use of large database programs such as Access or Oracle may be less optimal than other options, since the required data storage might total 1K. Small-scale databases such as mySQL or others could be employed, but it is currently believed that creation of a few suitable variables in the code is most appropriate.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

System(s) have been described herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors such as digital signal processors (DSPs). Thus, any blocks, components, sub-blocks, sub-components, modules and/or sub-modules may be realized by one or more DSPs. A DSP typically comprises a combination of digital logic devices and other components, which may be a state machine or implemented with a dedicated microprocessor or micro-controller running a software program or having functions programmed in firmware.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
sending, from a gateway router apparatus, interposed between a premises network and an internet, a first multicast SOLICIT message with a prefix length hint based on a number of network segments associated with said gateway router apparatus;
receiving, at said gateway router apparatus, a plurality of second multicast SOLICIT messages, from a plurality of routers in said premises network;
recording, at said gateway router apparatus:
  a prefix length hint associated with each of said plurality of second multicast SOLICIT messages; and
  an interface associated with each of said plurality of second multicast SOLICIT messages;
receiving, at said gateway router apparatus, a first ADVERTISE message, over said internet;
subtracting a prefix length hint from said prefix length hints recorded at said gateway router apparatus in said recording step, wherein said prefix length hint subtracted from said prefix length hints recorded at said gateway router apparatus was received on an interface where said first ADVERTISE was received;
sending, from said gateway router apparatus, a REQUEST message, over said internet, said REQUEST message specifying a prefix length based on said number of network segments associated with said gateway router apparatus and said prefix length hints associated with said plurality of second multicast SOLICIT messages recorded at said gateway router apparatus after said subtracting step; and
sending, from said gateway router apparatus, a second ADVERTISE message advertising ability of said gateway router apparatus to delegate prefixes in accordance with said REQUEST message.

2. The method of claim 1, further comprising:
receiving, at said gateway router apparatus, a REPLY message, over said internet, in accordance with said REQUEST message, said REPLY message having a prefix assignment;
dividing said prefix assigned in said REPLY message;
assigning each local interface of said gateway router a prefix of default length; and
sending a REPLY message from said gateway router apparatus to a downstream router with a prefix assignment in accordance with said prefix length hint associated with said downstream router.

3. The method of claim 1, further comprising:
calculating said prefix length hint of said first multicast SOLICIT message by:
  determining a total number of interfaces of said gateway router apparatus;
  subtracting one from said total number of interfaces of said gateway router apparatus to obtain a first result; and
  setting said prefix length hint of said first multicast SOLICIT message as a number of /64 prefixes in accordance with said first result; and
calculating said prefix length specified in said REQUEST message by:
  adding to said first result said prefix length hints of said plurality of second multicast SOLICIT messages to obtain a second result; and
  setting said prefix length specified in said REQUEST message as a number of /64 prefixes in accordance with said second result.

4. The method of claim 3, further comprising said gateway router apparatus waiting a predetermined time period prior to sending said REQUEST message, in order to allow sufficient time to receive at said gateway router apparatus pertinent communications from downstream thereof.

5. The method of claim 3, wherein, in said step of determining said total number of interfaces of said gateway router apparatus, at least one of said interfaces comprises multiple interfaces treated as a single interface.

6. The method of claim 3, wherein said REQUEST message comprises a first REQUEST message, further comprising:
sending, from a downstream router of said plurality of routers in said premises network, said second multicast SOLICIT message thereof, said prefix length hint thereof being based on a number of network segments associated with said downstream router;
receiving, at said downstream router:
  said first multicast SOLICIT message; and
  a third multicast SOLICIT message of said plurality of second multicast SOLICIT messages with a prefix length hint, from a still further downstream router in said premises network;
recording, at said downstream router:
  said prefix length hint of said first multicast SOLICIT message;
  an interface associated with said first multicast SOLICIT message;
  said prefix length hint of said third multicast SOLICIT message;
  an interface associated with said third multicast SOLICIT message; and
  said second ADVERTISE message;
receiving, at said downstream router, said second ADVERTISE message, over said premises network;
sending, from said downstream router, a second REQUEST message, over said premises network, said second REQUEST message specifying a prefix length based on said number of network segments associated with said downstream router and on said recorded prefix length hint of said third multicast SOLICIT message; and sending, from said downstream router, a third ADVERTISE message advertising ability of said downstream router to delegate prefixes in accordance with said second REQUEST message.

7. The method of claim 6, further comprising:
calculating said prefix length hint of said second multicast SOLICIT message associated with said downstream router by:
  determining a total number of interfaces of said downstream router;
  subtracting one from said total number of interfaces of said downstream router to obtain a third result; and
  setting said prefix length hint of said second multicast SOLICIT message as a number of /64 prefixes in accordance with said third result; and
calculating said prefix length specified in said second REQUEST message by:
  adding to said third result said third multicast SOLICIT message prefix length hint for each of said plurality of second multicast SOLICIT messages associated with a downstream router to obtain a fourth result; and
  setting said prefix length specified in said second REQUEST message as a number of /64 prefixes in accordance with said fourth result.

8. The method of claim 1, wherein at least one of said plurality of second multicast SOLICIT messages does not have a second multicast SOLICIT message prefix length hint, and wherein said prefix length hint is an estimated prefix length associated with said at least one of said plurality of second multicast SOLICIT messages comprises a default value.

9. The method of claim 8 wherein said default value comprises a value of /64.

10. The method of claim 1, further comprising providing a system, wherein the system comprises distinct software modules, each of the distinct software modules being embodied in a non-transitory manner on a tangible, computer-readable, recordable storage medium, and wherein the distinct software modules comprise a dynamic host control management process module, a dynamic host control client process module, and a dynamic host control server process module; wherein:
  said step of sending said first multicast SOLICIT message is carried out by said dynamic host control client process module executing on at least one hardware processor of said gateway router apparatus;
  said step of receiving said plurality of second multicast SOLICIT messages is carried out by said dynamic host control server process module executing on said at least one hardware processor of said gateway router apparatus;
  said step of recording is carried out by said dynamic host control management process module executing on said at least one hardware processor of said gateway router apparatus;
  said step of receiving said first ADVERTISE message is carried out by said dynamic host control client process module executing on said at least one hardware processor of said gateway router apparatus;
  said step of sending said REQUEST message is carried out by said dynamic host control client process module executing on said at least one hardware processor of said gateway router apparatus; and
  said step of sending said second ADVERTISE message is carried out by said dynamic host control server process module executing on said at least one hardware processor of said gateway router apparatus.

11. A method comprising the steps of:
sending, from a block-assigning router apparatus, a first multicast SOLICIT message with a prefix length hint based on a number of network segments associated with said block-assigning router apparatus;
receiving, at said block-assigning router apparatus:
  a second multicast SOLICIT message from an upstream router apparatus; and
  a third multicast SOLICIT message with a prefix length hint, from a downstream device;
recording, at said block-assigning router apparatus:
  a prefix length hint of said second multicast SOLICIT message;
  an interface associated with said second multicast SOLICIT message;
  said prefix length hint of said third multicast SOLICIT message;
  an interface associated with said third multicast SOLICIT message; and
  a first ADVERTISE message received from said upstream router apparatus;
sending, from said block-assigning router apparatus, a REQUEST message, over said premises network, said REQUEST message specifying a prefix length based on said number of network segments associated with said block-assigning router apparatus and on said recorded prefix length hint of said third multicast SOLICIT message, but not on said recorded prefix length hint of said second multicast SOLICIT message; and
sending, from said block-assigning router apparatus, a second ADVERTISE message advertising ability of said block-assigning router apparatus to delegate prefixes in accordance with said REQUEST message.

12. A gateway router apparatus interposed between a premises network and an internet, said gateway router apparatus comprising:
  a memory;
  at least one processor coupled to said memory; and
  a persistent storage device, tangibly embodying in a non-transitory manner instructions which when loaded into said memory cause said at least one processor to:
    send, from said gateway router apparatus, a first multicast SOLICIT message with a prefix length hint based on a number of network segments associated with said gateway router apparatus;
    receive, at said gateway router apparatus, a plurality of second multicast SOLICIT messages, from a plurality of routers in the premises network;
    record, at said gateway router apparatus:
      a prefix length hint associated with each of said plurality of second multicast SOLICIT messages; and
      an interface associated with each of said plurality of second multicast SOLICIT messages;
    receive, at said gateway router apparatus, a first ADVERTISE message, over the internet;
    subtract a prefix length hint from said prefix length hints recorded at said gateway router apparatus, wherein said prefix length hint subtracted from said prefix length hints recorded at said gateway router apparatus was received on an interface where said first ADVERTISE was received;
    send, from said gateway router apparatus, a REQUEST message, over said internet, said REQUEST message specifying a prefix length based on said number of network segments associated with said gateway router apparatus and said prefix length hints associated with said plurality of second multicast SOLICIT messages recorded at said gateway router apparatus after subtracting said prefix length hint received on said interface where said first ADVERTISE was received; and send, from said gateway router apparatus, a second ADVERTISE message advertising ability of said gateway router apparatus to delegate prefixes in accordance with said REQUEST message.

13. The gateway router apparatus of claim 12, wherein said persistent storage device further tangibly embodies in said non-transitory manner additional instructions which when loaded into said memory cause said at least one processor to:

receive, at said gateway router apparatus, a REPLY message, over said internet, in accordance with said REQUEST message, said REPLY message having a prefix assignment;

divide said prefix assigned in said REPLY message;

assign each local interface of said gateway router a prefix of default length; and send a REPLY message from said gateway router apparatus to a downstream router with a prefix assignment in accordance with said prefix length hint associated with said downstream router.

14. The gateway router apparatus of claim 12, wherein said persistent storage device further tangibly embodies in said non-transitory manner additional instructions which when loaded into said memory cause said at least one processor to:

calculate said prefix length hint of said first multicast SOLICIT message by:

determining a total number of interfaces of said gateway router apparatus;

subtracting one from said total number of interfaces of said gateway router apparatus to obtain a first result; and setting said prefix length hint of said first multicast SOLICIT message as a number of /64 prefixes in accordance with said first result; and calculate said prefix length specified in said REQUEST message by:

adding to said first result said prefix length hints of said plurality of second multicast SOLICIT messages to obtain a second result; and setting said prefix length specified in said REQUEST message as a number of /64 prefixes in accordance with said second result.

15. The gateway router apparatus of claim 14, wherein said persistent storage device further tangibly embodies in said non-transitory manner additional instructions which when loaded into said memory cause said at least one processor to cause said gateway router apparatus to wait a predetermined time period prior to sending said REQUEST message, in order to allow sufficient time to receive at said gateway router apparatus pertinent communications from downstream thereof.

16. The gateway router apparatus of claim 14, wherein said instructions, when loaded into said memory, cause said at least one processor to determine said total number of interfaces of said gateway router apparatus by treating, as a single one of said interfaces, multiple interfaces.

17. The gateway router apparatus of claim 12, wherein at least one of said plurality of second multicast SOLICIT messages does not have a second multicast SOLICIT message prefix length hint, and wherein said prefix length hint is an estimated prefix length associated with said at least one of said plurality of second multicast SOLICIT messages comprises a default value.

18. The gateway router apparatus of claim 17 wherein said default value comprises a value of /64.

19. The gateway router apparatus of claim 12, wherein said instructions are organized as a plurality of distinct software modules, and wherein the distinct software modules comprise a dynamic host control management process module, a dynamic host control client process module, and a dynamic host control server process module;

wherein said at least one processor:

sends said first multicast SOLICIT by executing said dynamic host control client process module;

receives said plurality of second multicast SOLICIT messages by executing said dynamic host control server process module;

records said estimated prefix length and said interface by executing said dynamic host control management process module;

receives said first ADVERTISE message by executing said dynamic host control client process module;

sends said REQUEST message by executing said dynamic host control client process module; and sends said second ADVERTISE message by executing said dynamic host control server process module.

20. A block-assigning router apparatus, within a premises network, interposed between an upstream router apparatus and a downstream router apparatus, said block-assigning router apparatus comprising:

a memory;

at least one processor coupled to said memory; and a persistent storage device, tangibly embodying in a non-transitory manner instructions which when loaded into said memory cause said at least one processor to:

send, from said block-assigning apparatus, a first multicast SOLICIT message with a prefix length hint based on a number of network segments associated with said block-assigning router apparatus;

receive, at said block-assigning router apparatus:

a second multicast SOLICIT message from said upstream router; and a third multicast SOLICIT message with a prefix length hint, from said downstream router;

record, at said block-assigning router apparatus:

said prefix length hint of said second multicast SOLICIT message;

an interface associated with said second multicast SOLICIT message;

said prefix length hint of said third multicast SOLICIT message;

an interface associated with said third multicast SOLICIT message; and an first ADVERTISE message received from said upstream router apparatus;

send, from said block-assigning router, a REQUEST message, over said premises network, said REQUEST message specifying a prefix length based on said number of network segments associated with said block-assigning router and on said recorded prefix length hint of said third multicast SOLICIT message, but not on said recorded prefix length hint of said second multicast SOLICIT message; and send, from said block-assigning router apparatus, a second ADVERTISE message advertising ability of said block-assigning router apparatus to delegate prefixes in accordance with said REQUEST message.

21. An article of manufacture comprising a computer program product, said computer program product comprising:
a tangible computer-readable recordable storage medium, storing in a non-transitory manner computer readable program code for execution by at least one processor of a gateway router apparatus interposed between a premises network and an internet, the computer readable program code comprising:
computer readable program code configured to send, from said gateway router apparatus, a first multicast SOLICIT message with a prefix length hint based on a number of network segments associated with said gateway router apparatus;
computer readable program code configured to receive, at said gateway router apparatus, a plurality of second multicast SOLICIT messages, from a plurality of routers in the premises network;
computer readable program code configured to record, at said gateway router apparatus:
a prefix length hint associated with each of said plurality of second multicast SOLICIT messages; and
an interface associated with each of said plurality of second multicast SOLICIT messages;
computer readable program code configured to receive, at said gateway router apparatus, a first ADVERTISE message, over the internet;
computer readable program code configured to subtract a prefix length hint from said prefix length hints recorded at said gateway router apparatus, wherein said prefix length hint subtracted from said prefix length hints recorded at said gateway router apparatus was received on an interface where said first ADVERTISE was received;
computer readable program code configured to send, from said gateway router apparatus, a REQUEST message, over said internet, said REQUEST message specifying a prefix length based on said number of network segments associated with said gateway router apparatus and said prefix length hints associated with said plurality of second multicast SOLICIT messages recorded at said gateway router apparatus after subtracting said prefix length hint received on said interface where said first ADVERTISE was received; and
computer readable program code configured to send, from said gateway router apparatus, a second ADVERTISE message advertising ability of said gateway router apparatus to delegate prefixes in accordance with said REQUEST message.

22. A gateway router apparatus interposed between a premises network and an internet, said gateway router apparatus comprising:
means for sending, from said gateway router apparatus, a first multicast SOLICIT message with a prefix length hint based on a number of network segments associated with said gateway router apparatus;
means for receiving, at said gateway router apparatus, a plurality of second multicast SOLICIT messages, from a plurality of routers in the premises network;
means for recording, at said gateway router apparatus:
a prefix length hint associated with each of said plurality of second multicast SOLICIT messages; and
an interface associated with each of said plurality of second multicast SOLICIT messages;
means for receiving, at said gateway router apparatus, a first ADVERTISE message, over the internet;
means for subtracting a prefix length hint from said prefix length hints recorded at said gateway router apparatus, wherein said prefix length hint subtracted from said prefix length hints recorded at said gateway router apparatus was received on an interface where said first ADVERTISE was received;
means for sending, from said gateway router apparatus, a REQUEST message, over said internet, said REQUEST message specifying a prefix length based on said number of network segments associated with said gateway router apparatus and said prefix length hints associated with said plurality of second multicast SOLICIT messages recorded at said gateway router apparatus after subtracting said prefix length hint received on said interface where said first ADVERTISE was received; and
means for sending, from said gateway router apparatus, a second ADVERTISE message advertising ability of said gateway router apparatus to delegate prefixes in accordance with said REQUEST message.

* * * * *